US010794363B2

(12) United States Patent
Beatrice et al.

(10) Patent No.: US 10,794,363 B2
(45) Date of Patent: Oct. 6, 2020

(54) WIND TURBINE CURTAILMENT CONTROL FOR VOLANT ANIMALS

(71) Applicants: Amanda A. Beatrice, Stuart, FL (US); Julie Sangiovanni Rice, Hobe Sound, FL (US); Daniel J. Shrader, Jr., Port Saint Lucie, FL (US); Santosh Kanthety, Jupiter, FL (US); Janine Bacquie, Jupiter, FL (US); Christian Andrew Kiernan, Palm Beach Gardens, FL (US)

(72) Inventors: Amanda A. Beatrice, Stuart, FL (US); Julie Sangiovanni Rice, Hobe Sound, FL (US); Daniel J. Shrader, Jr., Port Saint Lucie, FL (US); Santosh Kanthety, Jupiter, FL (US); Janine Bacquie, Jupiter, FL (US); Christian Andrew Kiernan, Palm Beach Gardens, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 204 days.

(21) Appl. No.: 15/429,922

(22) Filed: Feb. 10, 2017

(65) Prior Publication Data

US 2018/0230967 A1    Aug. 16, 2018

(51) Int. Cl.
*F03D 7/02*     (2006.01)
*F03D 17/00*   (2016.01)
(Continued)

(52) U.S. Cl.
CPC .......... *F03D 7/0264* (2013.01); *F03D 7/028* (2013.01); *F03D 17/00* (2016.05); *G05B 15/02* (2013.01);
(Continued)

(58) Field of Classification Search
CPC .................. G05B 2219/2619; F05B 2270/504
(Continued)

(56) References Cited

U.S. PATENT DOCUMENTS 9,416,769 B2 * 8/2016 Nielsen .................... F03D 7/042
2011/0192212 A1 * 8/2011 Delprat .................... F03D 17/00
                                                                73/12.01
(Continued)

OTHER PUBLICATIONS

Burnett, "Cal Poly Wind Turbine Speed Controller" California Polytechnic and State University, 2010, 56 Pgs. (Year: 2010).*
(Continued)

*Primary Examiner* — Emilio J Saavedra
(74) *Attorney, Agent, or Firm* — Tarolli, Sundheim, Covell & Tummino LLP

(57) ABSTRACT

A system can include a data server that calculates a risk level of each of a plurality of wind turbines at a turbine site based at least in part on a base risk level and mortality data that characterizes a mortality of a volant animal caused by a given wind turbine of the plurality of wind turbines. The system can also include a turbine monitor server that stores the risk level of each wind turbine in a database and generates a graphical dashboard based on data in the database. The system can further include a turbine site control server that retrieves data from the database and sets cut-in speed of each of the plurality of wind turbines based on the data retrieved from the database.

20 Claims, 18 Drawing Sheets

(51) Int. Cl.
G05B 15/02 (2006.01)
F03D 7/04 (2006.01)

(52) U.S. Cl.
CPC ........ F03D 7/048 (2013.01); F05B 2260/821 (2013.01); F05B 2270/404 (2013.01); F05B 2270/504 (2013.01); Y02E 10/723 (2013.01); Y02E 10/725 (2013.01)

(58) Field of Classification Search
USPC ...................................................... 73/12.01
See application file for complete search history.

(56) References Cited

U.S. PATENT DOCUMENTS

| | | | | |
|---|---|---|---|---|
| 2012/0136495 | A1* | 5/2012 | Lagrange | G05B 13/0265 700/287 |
| 2013/0280033 | A1* | 10/2013 | Babbitt | A01K 11/006 415/1 |
| 2014/0172513 | A1* | 6/2014 | MacLean | G06Q 30/018 705/7.39 |
| 2016/0050889 | A1* | 2/2016 | Wenger | G06T 7/20 348/47 |
| 2016/0055400 | A1* | 2/2016 | Jorquera | F03D 1/06 416/1 |

OTHER PUBLICATIONS

"Wind Turbine Interactions with Birds, Bats, and their Habitats: A Summary of Research Results and Priority Questions" Spring 2010, 8 Pgs., by National Wind Coordinating Collaborative (Year: 2010).*

Stantec Consulting Ltd., "Bird and Bat Mortality Risk Assessment Framework for the Chaplin Wind Energy Project" Sep. 3, 2015, 44 pgs. (Year: 2015).*

Ohio Department of Natural Resource, "On-Shore Bird and Bat Pre- and Post-Construction Monitoring Protocol for Commercial Wind Energy Facilities in Ohio" An Addendum to the Ohio Department of Natural Resource's Voluntary Cooperative Agreement, May 4, 2009, 40 Pgs. (Year: 2009).*

Ohio Department of Natural "On-shore Bird and Bat Pre- and Post-Construction Monitoring Protocol for Commercial Wind Energy Facilities in Ohio: An Addendum to the Ohio Department of Natural Resource's Voluntary Cooperative Agreement", May 4, 2009, 40 Pgs. (Year: 2009).*

Wildcat Wind Farm I, LLC, "Indiana Bat and Northern Long-eared Bat Habitat Conservation Plan" Aug. 2016, 283 Pgs. (Year: 2016).*

Dalthrop et al., "Evidence of Absence Software User Guide" U.S. Department of the Interior, U.S. Geological Survey, 2014, 42 Pgs. (Year: 2014).*

Ledec et al., "Greening the Wind: Environmental and Social Considerations for Wind Power Development" The World Bank, 2011, 172 Pgs. (Year: 2011).*

Andrews: "Avian Radar Technologies: Wind Energy Project Application", found on the internet at: http://www.radarmeteo.com/documentazione/DeTect_Avian_Radar_Technologies_for_Wind.pdf, pp. 2-3, 8-11 and 15-19, Oct. 2010.

Puente: "DTBat® System Specifications for Wind Turbines", found on the internet at: http://www.dtbat.com/images/Downloads/DTBat_System_Specifications_for_WindTurbines.pdf, p. 4, Jun. 2016.

Tetratech: "Searchlight Wind Energy Project Bird and Bat Conservation Strategy", found on internet at: https://energy.gov/sites/prod/files/EIS-0413-FEIS_Appendix%20B-4_Bat%20and%20Bird%20Conservation%20Strategy.pdf, pp. 34-43 and 53-55, Oct. 2012.

* cited by examiner

| Turbine Site | Date Found | Wind Turbine | Mortality Type | Species | Species of Concern (Y/N) | M-P | Within Threshold Distance |
|---|---|---|---|---|---|---|---|
| Site 7 | 3/30/2016 | T03 | Raptor | Turkey Vulture | No | Type 2 | No |
| Site 2 | 4/12/2016 | T13 | Raptor | Turkey Vulture | No | Type 2 | |
| Site 4 | 4/15/2016 | T216 | Bird | Mourning Dove | No | Type 1 | |
| Site 8 | 4/20/2016 | T74 | Raptor | Turkey Vulture | No | Type 1 | |
| Site 3 | 4/22/2016 | T41 | Bat | Bat Species | No | Type 2 | |
| Site 7 | 4/22/2016 | T73 | Bat | Big Brown Bat | No | Type 1 | |
| Site 3 | 4/25/2016 | T23 | Raptor | Red-tailed Hawk | No | Type 2 | |
| Site 1 | 4/25/2016 | T28 | Raptor | Red-tailed Hawk | No | Type 2 | |
| Site 7 | 4/25/2016 | T41 | Raptor | Red-tailed Hawk | No | Type 1 | |
| Site 8 | 4/26/2016 | T18 | Raptor | Red-tailed Hawk | No | Type 2 | |
| Site 8 | 4/27/2016 | T20 | Bird | Horned Lark | No | Type 2 | |
| Site 9 | 4/28/2016 | T23 | Raptor | Red-tailed Hawk | No | Type 2 | |
| Site 6 | 4/28/2016 | T07 | Raptor | Golden Eagle | Yes | Type 2 | No |
| Site 6 | 4/28/2016 | T17 | Raptor | Red-tailed Hawk | No | Type 1 | |

FIG. 4

| Site Code | SITE | Turbine | Start Date | M-P | Curtailment Group | Curtailment Level (Cut-In Speed m/s) | Baseline Risk Rank | SOC 1 Curtailment Plan | SOC 2 Curtailment Plan | SOC 3 Curtailment Plan | SOC 4 Curtailment Plan | SOC 4 Curtailment Plan | Site Bpt Rate | Bat per Turbine Threshold | Mortalities as of 7/1 | All Mortalities | SOC Count |
|---|---|---|---|---|---|---|---|---|---|---|---|---|---|---|---|---|---|
| WF1 | Site 1 | T48 | 4/27/2016 | Type 2 | AM | 0 | -2 | SOC-P1 | SOC-P1 | SOC-P1 | SOC-P1 | SOC-P1 | 4.96 | 12 | 6 | 6 | 0 |
| WF1 | Site 1 | T01 | 4/27/2016 | Type 1 | AM | 0 | 3 | SOC-P1 | SOC-P1 | SOC-P1 | SOC-P1 | SOC-P1 | 4.24 | 12 | 0 | 0 | 0 |
| WF1 | Site 1 | T02 | 4/27/2016 | Type 2 | AM | 0 | 0 | SOC-P1 | SOC-P1 | SOC-P1 | SOC-P1 | SOC-P1 | 3.87 | 12 | 5 | 5 | 0 |
| WF1 | Site 1 | T03 | 4/27/2016 | Type 1 | AM | 0 | 3 | SOC-P1 | SOC-P1 | SOC-P1 | SOC-P1 | SOC-P1 | 2.55 | 12 | 0 | 0 | 0 |
| WF1 | Site 1 | T04 | 4/27/2016 | Type 1 | AM | 0 | 0 | SOC-P1 | SOC-P1 | SOC-P1 | SOC-P1 | SOC-P1 | 4.71 | 12 | 2 | 2 | 0 |
| WF1 | Site 1 | T05 | 4/27/2016 | Type 2 | MC | 5.5 | 1 | SOC-P3 | SOC-P1 | SOC-P1 | SOC-P1 | SOC-P1 | 3.50 | 12 | 2 | 2 | 0 |
| WF1 | Site 1 | T06 | 4/27/2016 | Type 2 | AM | 0 | 3 | SOC-P1 | SOC-P1 | SOC-P1 | SOC-P1 | SOC-P1 | 2.96 | 12 | 0 | 0 | 0 |
| WF1 | Site 1 | T07 | 4/27/2016 | Type 1 | AM | 0 | 3 | SOC-P1 | SOC-P1 | SOC-P1 | SOC-P1 | SOC-P1 | 1.78 | 12 | 0 | 0 | 0 |
| WF1 | Site 1 | T08 | 4/27/2016 | Type 1 | AM | 0 | 3 | SOC-P1 | SOC-P1 | SOC-P1 | SOC-P1 | SOC-P1 | 4.01 | 12 | 0 | 0 | 0 |
| WF1 | Site 1 | T09 | 4/27/2016 | Type 1 | AM | 0 | 0 | SOC-P1 | SOC-P1 | SOC-P1 | SOC-P1 | SOC-P1 | 3.22 | 12 | 0 | 0 | 0 |
| WF1 | Site 1 | T10 | 4/27/2016 | Type 2 | AM | 0 | 2 | SOC-P1 | SOC-P1 | SOC-P1 | SOC-P1 | SOC-P1 | 2.33 | 12 | 5 | 5 | 0 |
| WF1 | Site 1 | T11 | 4/27/2016 | Type 1 | AM | 0 | 3 | SOC-P1 | SOC-P1 | SOC-P1 | SOC-P1 | SOC-P1 | 2.45 | 12 | 1 | 1 | 0 |
| WF1 | Site 1 | T12 | 4/27/2016 | Type 1 | AM | 0 | 3 | SOC-P1 | SOC-P1 | SOC-P1 | SOC-P1 | SOC-P1 | 4.08 | 12 | 1 | 1 | 0 |
| WF1 | Site 1 | T13 | 4/27/2016 | Type 2 | AM | 0 | -3 | SOC-P1 | SOC-P1 | SOC-P1 | SOC-P1 | SOC-P1 | 4.29 | 12 | 9 | 9 | 0 |
| WF2 | Site 2 | T40 | 4/27/2016 | Type 1 | AM | 0 | 7 | SOC-P1 | SOC-P1 | SOC-P1 | SOC-P1 | SOC-P1 | 1.18 | 12 | 2 | 2 | 0 |
| WF2 | Site 2 | T01 | 4/27/2016 | Type 2 | MC | 5.5 | -6 | SOC-P2 | SOC-P1 | SOC-P1 | SOC-P1 | SOC-P1 | 2.08 | 12 | 6 | 6 | 0 |

FIG. 5

Mortality Tracking Dashboard
[2013] [2014] [2015] [2016]
To select multiple years, hold CTRL and click on the years to display.
Mortality Rates per Turbine

| | Site 1 | Site 2 | Site 3 | Site 4 | Site 5 | Site 6 | Site 7 | Site 8 | Site 9 | Bat <90%BPT Threshold | Within 10%BPT Threshold | >BPT Threshold |
|---|---|---|---|---|---|---|---|---|---|---|---|---|
| 2016 | | | | | | | | | | | | |
| Bat Rate per Turbine | 4.96 | 2.08 | 4.66 | 3.35 | | 4.90 | 3.55 | 2.20 | 4.60 | | | |
| Bird Rate per Turbine | 4.04 | 4.05 | 2.02 | 4.28 | | 4.64 | 4.72 | 4.36 | 3.07 | | | |
| 2015 | | | | | | | | | | Bird | <6 | Btwn 6-8 | >8 |
| Bat Rate per Turbine | 4.74 | 3.14 | 4.02 | | 3.26 | | 1.61 | 2.65 | 4.06 | | | |
| Bird Rate per Turbine | 4.56 | 3.96 | 2.17 | | 3.13 | | 4.04 | 2.84 | 4.38 | | | |
| 2014 | | | | | | | | | | | | |
| Bat Rate per Turbine | | | | | 4.05 | | | | 4.99 | | | |
| Bird Rate per Turbine | | | | | 2.83 | | | | 3.90 | | | |
| 2013 | | | | | | | | | | | | |
| Bat Rate per Turbine | | | | | 4.81 | | | | | | | |
| Bird Rate per Turbine | | | | | 3.03 | | | | | | | |

Remaining Bat Mortalities

| | Site 1 | Site 2 | Site 3 | Site 4 | Site 5 | Site 6 | Site 7 | Site 8 | Site 9 |
|---|---|---|---|---|---|---|---|---|---|
| 2016 | | | | | | | | | |
| Bat Good Variable | 13 | 30 | 26 | 12 | | 0 | 26 | 59 | 52 |
| Bat Average Variable | 8 | 19 | 16 | 8 | | 0 | 16 | 38 | 34 |
| Bat Bad Variable | 2 | 4 | 4 | 2 | | 0 | 4 | 9 | 8 |
| 2016 | | | | | | | | | |

FIG. 8

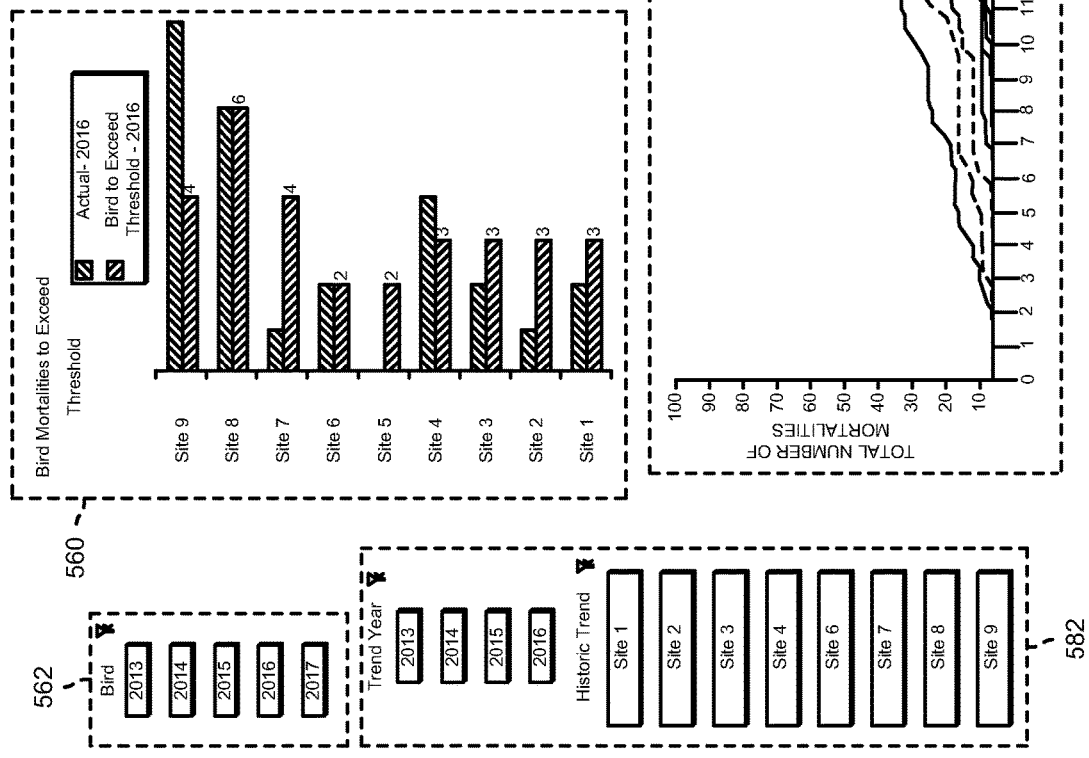
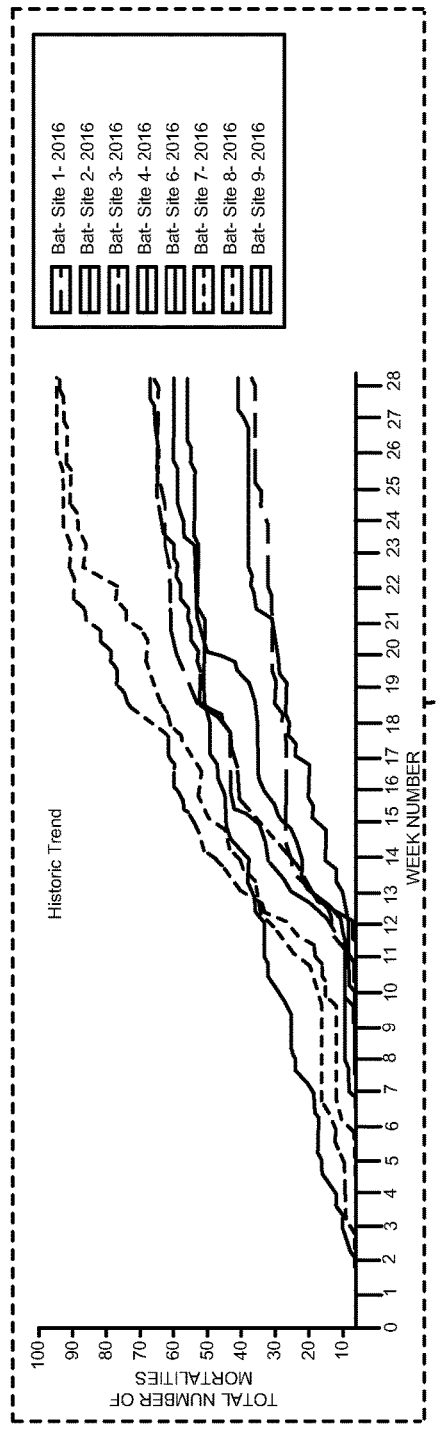
FIG. 10

Bat Mortalities By Species Count

| Bat Species | Site 1 | Site 2 | Site 3 | Site 4 | Site 5 | Site 6 | Site 7 | Site 8 | Site 9 | Total |
|---|---|---|---|---|---|---|---|---|---|---|
| Big Brown Bat | 0 | 0 | 1 | 2 | 0 | 5 | 1 | 0 | 0 | 9 |
| Eastern Red Bat | 15 | 9 | 12 | 16 | 1 | 10 | 19 | 22 | 15 | 119 |
| Hoary Bat | 24 | 10 | 19 | 11 | 0 | 4 | 17 | 30 | 14 | 129 |
| Little Brown Myotis | 9 | 7 | 18 | 7 | 9 | 15 | 25 | 40 | 18 | 148 |
| Silver haired Bat | 0 | 1 | 1 | 3 | 8 | 1 | 3 | 2 | 5 | 24 |
| Total | 27 | 9 | 14 | 23 | 19 | 8 | 30 | 30 | 14 | 174 |
| | 75 | 36 | 65 | 62 | 37 | 43 | 95 | 124 | 66 | 603 |

M-P: Type 1, Type 2

Bat Mortalities % Species by Site

| Bat Species | Site 1 | Site 2 | Site 3 | Site 4 | Site 5 | Site 6 | Site 7 | Site 8 | Site 9 | Total |
|---|---|---|---|---|---|---|---|---|---|---|
| Big Brown Bat | 0% | 0% | 2% | 3% | 0% | 12% | 1% | 0% | 0% | 1% |
| Eastern Red Bat | 20% | 25% | 18% | 26% | 3% | 23% | 20% | 18% | 23% | 20% |
| Hoary Bat | 32% | 28% | 29% | 18% | 0% | 9% | 18% | 24% | 21% | 21% |
| Little Brown Myotis | 12% | 19% | 28% | 11% | 24% | 35% | 26% | 32% | 27% | 25% |
| Silver haired Bat | 0% | 3% | 2% | 5% | 22% | 2% | 3% | 2% | 8% | 4% |
| Total | 36% | 25% | 22% | 37% | 51% | 19% | 32% | 24% | 21% | 29% |
| | 100% | 100% | 100% | 100% | 100% | 100% | 100% | 100% | 100% | 100% |

Year: 2013, 2014, 2015, 2016

Turbine Risk Rank Change Notification

Notification for Change to High and Advanced curtailment risk levels within last 24 hour.                                    Report Data:9/30/2015 9.26.20 AM

| Site | Turbine | Change Data | Start Risk Level | End Risk Level | BPT Threshold | Site BPT Rate | SOC Count | All Mortalities |
|---|---|---|---|---|---|---|---|---|
| Site 1 | T02 | 09/22/2015 | High (3) | Advanced curtailment | 12 | 4.98 | 0 | 5 |
| | | 09/21/2015 | High | High (3) | | | | |
| | | 09/01/2015 | Medium | High | | | | |
| | | 07/01/2015 | Low | Medium | | | | |
| | | 05/21/2015 | Normal Ops | Low | | | | |
| | T06 | 09/22/2015 | High (2) | Advanced curtailment | 12 | 3.78 | 0 | 7 |
| | | 09/21/2015 | High (1) | High (2) | | | | |
| | | 09/18/2015 | High (1) | High (2) | | | | |
| | | 09/08/2015 | Low | High (1) | | | | |
| | | 09/04/2015 | Low | Low | | | | |
| | | 05/21/2015 | Normal Ops | Low | | | | |
| | T28 | 09/22/2015 | Advanced curtailment (2) | 2nd Step Adv curtailment | 12 | 3.90 | 0 | 6 |
| | | 09/21/2015 | Advanced curtailment (1) | Advanced curtailment (2) | | | | |
| | | 09/18/2015 | Advanced curtailment (1) | Advanced curtailment (2) | | | | |
| | | 09/12/2015 | Advanced curtailment | Advanced curtailment (1) | | | | |
| | | 09/10/2015 | High (2) | Advanced curtailment | | | | |
| | | 09/08/2015 | High (1) | High (2) | | | | |
| | | 09/04/2015 | Medium | High (1) | | | | |
| | | 07/01/2015 | Low | Medium | | | | |
| | | 05/21/2015 | Normal Ops | Low | | | | |
| Site 2 | T09 | 09/26/2015 | Advanced curtailment (1) | 2nd Step Adv curtailment | 12 | 4.00 | 0 | 5 |
| | | 09/25/2015 | Advanced curtailment | Advanced curtailment (1) | | | | |
| | | 09/10/2015 | High (2) | Advanced curtailment | | | | |

WIND TURBINE CURTAILMENT CONTROL FOR VOLANT ANIMALS

TECHNICAL FIELD

This disclosure relates to controlling wind turbines. More particularly, this disclosure relates to curtailing wind turbines based on a mortality rate of aviation wildlife.

BACKGROUND

A wind turbine is a device that converts the wind's kinetic energy into electrical power. Wind turbines are manufactured in a wide range of vertical and horizontal axis types. Arrays of large turbines, known as wind farms or turbine sites are becoming an increasingly large source of clean renewable energy and are used by many countries as part of a strategy to reduce reliance on fossil fuels while reducing pollution and enhancing the environment of our society.

Widespread deployment of wind turbines may have an adverse effect on certain species of volant animals (flying animals), such as birds and bats that roost in trees and migrate. In particular, many volant animals collide with wind turbines while generating the clean renewable electric power consumed by our society resulting in an undesirable volant animal mortality.

SUMMARY

One example relates to a system that can include a data server that calculates a risk level of each of a plurality of wind turbines at a turbine site based at least in part on a base risk level and mortality data that characterizes a mortality of a volant animal caused by a given wind turbine of the plurality of wind turbines. The system can also include a turbine monitor server that stores the risk level of each wind turbine in a database and generates a graphical dashboard based on data in the database. The system can further include a turbine site control server that retrieves data from the database and sets a cut-in speed for each of the plurality of wind turbines based on the data retrieved from the database.

Another example relates to a server that can include a non-transitory memory that stores machine readable instructions and a processing unit that accesses the memory and executes the machine readable instructions. The machine readable instructions can include a data analyzer that receives mortality data comprising a list of mortalities of volant animals for a plurality of wind turbines at a plurality of turbine sites and calculates a risk level of each of a plurality of wind turbines at a turbine site based at least in part on a base risk level associated with each of the plurality of wind turbines and the mortality data. The risk level can correspond to a curtailment plan for an associated wind turbine.

Yet another example relates to a method can that include receiving a base risk level for each of a plurality of wind turbines. Each base risk level is based on a geographical location of an associated wind turbine. The method can also include receiving mortality data characterizing a list of recorded volant animal mortalities. Each recorded volant animal mortality can be associated with a particular wind turbine. The method can further include calculating a risk level for each of the plurality of wind turbines based on the mortality data and the base risk level. The method can still further include sending a cut-in speed of each of the plurality of wind turbines to one or more programmable logic controllers based on the calculated risk level.

BRIEF DESCRIPTION OF THE DRAWINGS

FIG. 4 illustrates a spreadsheet that includes an example of mortality data.

FIG. 5 illustrates a spreadsheet that includes an example of risk data.

FIG. 8 illustrates an example view of a dashboard.

FIG. 10 illustrates yet another example view of a dashboard.

FIG. 14 illustrates an additional example view of a dashboard.

FIG. 15 illustrates an example of a notification webpage.

DETAILED DESCRIPTION

Figure 1:
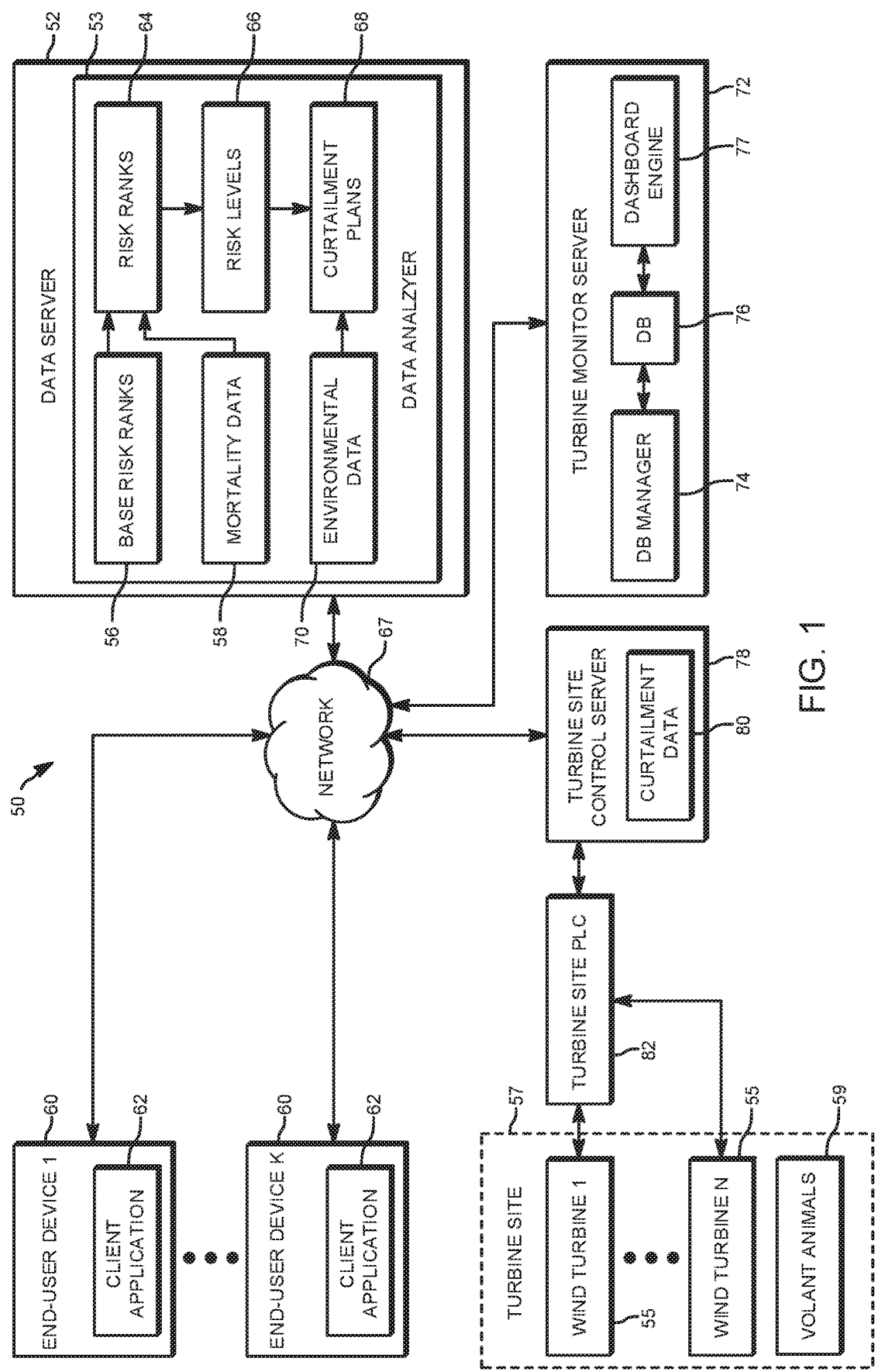
FIG. 1 illustrates an example of a system for adaptively curtailing wind turbines.

This disclosure is directed to systems and methods for controlling curtailment (e.g., adaptive curtailing) of wind turbines to reduce volant animal mortality caused by collisions with wind turbines generating electricity located at a turbine site. A searcher can be deployed to search the turbine site for volant animal mortalities on a given day. The searcher can input mortality data at a computing device characterizing a number of volant animal mortalities at the turbine site on the given day.

The mortality data can be stored at a data server. In one example, the mortality data can be adjusted (e.g., "scrubbed") for uncertainty (e.g., searcher efficiency bias, scavenger bias, etc.). The data server can also receive an assigned baseline risk rank for each of the wind turbines. In at least one example, the baseline rank can be tuned for a specific type and/or species of volant animal, such as bats. In such an example, the assignment of the baseline risk rank can be based on parameters (e.g., proximity of the one or more wind turbines to water, woods, etc.) associated with the one or more wind turbines and/or based on migration pattern data characterizing bat migrations at or near the turbine site. The data server programmed to assign an individual risk level (e.g., low, medium and high) to each of the wind turbines based on an assigned baseline risk rank and the mortality data. Each assigned risk level characterizes a risk of future volant animal mortalities at each of the wind turbines of the turbine site. The data server can be programmed to analyze the (aforementioned) mortality data by applying a defined risk level model (e.g., equations and/or criteria) to the mortality data to determine the risk level.

The risk levels can be stored in a database by a turbine monitor server. The turbine monitor server can control a (graphical) dashboard that outputs data characterizing the risk level of each of the wind turbines, as well as historical trends for the wind turbines.

A turbine site control server can be programmed to periodically and/or asynchronously retrieve the risk levels from the database and communicate with a programmable logic controller (PLC) at the turbine site to set a curtailment level (e.g., cut-in speed) for each of the wind turbines based on the retrieved individual risk levels. Thus, the system described herein can be programmed to adaptively curtail, on an individual level, each of the wind turbines based on updates to the mortality data. The updating can occur within a few hours of the mortality data being updated by the searchers at the computer. Adaptively curtailing the one or more wind turbines substantially reduces volant animal mortalities (including bat mortalities) and reduces wind turbine down-time.

It is noted that throughout this disclosure, many specific examples of adaptive curtailment are given with respect to bat mortalities. It is to be understood that the same concepts and principles described herein can be applied to other types of volant animals, including birds, insects, raptors, etc.

FIG. 1 illustrates an example of a system 50 for controlling curtailment (e.g., adaptive curtailment) of wind turbines. As used herein, the term "curtailment" denotes a reduction in the scheduled capacity or energy delivery. In many instances, a wind turbine is curtailed by increasing a "cut-in" speed of the wind turbine, which corresponds to a minimum wind speed at which the wind turbine will generate usable power (electricity). A wind turbine 55 that is idle (not generating power) poses substantially less risk to volant animals than a wind turbine that is active (e.g., generating power).

The system 50 can include a data server 52 that can analyze and process data to determine a risk levels for N number of wind turbines 55 in a turbine site 57, where N is an integer greater than or equal to one. In some examples, the data server 52 can determine the risk levels for wind turbines at a plurality of turbine sites. However, for purposes of simplification of explanation, a single turbine site 57 is described in the example shown in FIG. 1.

Volant (flying) animals (schematically illustrated as reference number 59) may intermittently be in proximity to one or more of the N number of wind turbines 55 of the turbine site 57. As explained herein, by selectively curtailing power generation of the N number of wind turbines 55, mortalities caused by collisions between a volant animal 59 and a wind turbine 55 may be reduced.

The data server 52 can be implemented as a computer. Moreover, the data server 52 could be implemented, for example, as a single (stand-alone) server and/or integrated with other servers. In other examples, the data server 52 can be a virtual machine executing in a cloud computing environment.

The data server 52 can execute a data analyzer 53. The data analyzer 53 can store a base risk rank 56 for each wind turbine 55 in the turbine site 57. As used herein, the term "risk rank" denotes a probability that a given wind turbine 55, if generating power, will incur a higher mortality rate of volant animals 59 than is acceptable. Thus, the higher the risk rank for the given wind turbine 55, the more likely volant animals 59 will impact the given wind turbine 55 if the given wind turbine 55 is activated (e.g., generating power). The base risk rank 56 for each wind turbine 55 can be a relatively static value (number) that could be based on a detailed analysis of each wind turbine 55 and the geographic location of the wind turbine 55. For example, due to the inherent presence of volant animals 59 near woods and water sources (e.g., birds and/or bats), a given wind turbine 55 in a given turbine 55 (e.g., turbine 1) site that is closer to woods may have a higher base risk rank than another wind turbine 55 (e.g., turbine 2) in the turbine site 57 that is relatively far away from the woods and/or water source.

The data analyzer 53 can also receive mortality data 58. The mortality data 58 represents a recorded mortality of each volant animal 59 observed for a particular day. The mortality data 58 could be, for example, a list of instances of recorded volant animal mortality. Each recorded mortality can be associated with a particular wind turbine 55 at the turbine site 57. Additionally, data analyzer 53 can be programmed to adjust the mortality data 58 in situations where a particular wind turbine 55 has an associated uncertainty (e.g., searcher efficiency bias, scavenger bias, etc.).

Each instance of recorded mortality of a volant animal 59 can represent a physically observed mortality. For instance, searches (people and/or drones) can be deployed at the turbine site 57 daily to search for carcasses of (dead) volant animals 59. In such a situation, it is presumed that a carcasses located in physical proximity of a given wind turbine 55 of the turbine site 57 is responsible for the resultant mortality of the volant animal 59. Accordingly, the species of the volant animal 59 is recorded as well and the given wind turbine 55 and the turbine site 57 is noted as well. The collective instances of recorded volant animal mortalities forms the mortality data 58 for the particular day.

In some examples, the mortality data 58 can be entered as user input in the data server (e.g., in a spreadsheet). In other examples, the mortality data 58 can be provided from K number of end-user devices 60, where K is an integer greater than or equal to one. Each end-user device 60 could be, for example, a mobile device (e.g., a smartphone, a tablet computer, a laptop computer, etc.) or a wired device (e.g., a desktop computer). In such a situation, each of the K number of devices 60 can have a client application 62 executing thereon. The client application 62 can provide a graphical user interface (GUI) that can receive input characterizing each instance of a recorded volant animal mortality. The client application 62 could be, for example, a web browser, a stand-alone application or a web browser plugin. The instances of volant animal mortality can be provided to the data server 52 via a network 67. The network 67 can be a public network (e.g., the Internet) a private network (e.g., a local area network) or a combination thereof (e.g., a virtual private network (VPN)).

The data analyzer 53 can determine a risk rank 64 for each wind turbine 55 in the turbine site 57 based on an aggregation of the base risk ranks 56 and the mortality data 58. In particular, the data analyzer 53 can tally the total number of mortalities for the given wind turbine 55 based on the mortality data 58. Additionally, the data analyzer 53 can determine a total number of mortalities per wind turbine 55 at the turbine site 57. The risk ranks 64 (e.g., a numerical value) can be mapped to risk levels 66. The risk levels 66 can be a qualitative value, such as low, medium, high or advanced curtailment. Each risk level 66 can be associated with a particular (minimum) cut-in speed for the wind turbine 55. In general, as discussed herein, the greater the risk level, the higher the cut-in speed.

The data analyzer 53 can also store environmental data 70. The environmental data can include data related to governmental regulations, a list of volant animal species of concern (SOC), etc. The data analyzer 53 can examine the environmental data 70 and the risk level 66 to determine a curtailment plan 68 for each wind turbine 55 in the turbine site 57. The curtailment plans 68 can include, for example, normal operations, a mandatory curtailment plan and a species of concern protocol (SOC-P) curtailment. Additionally, there may be multiple sub curtailment plans, such as multiple SOC-Ps (e.g., SOC-P1, SOC-P2 and SOC-P3). In situations where the past performance of a particular turbine 55 has caused an unacceptable number of volant animal mortalities, a business or government may mandate that the particular curtailment plan 68 be employed (e.g., a high cut-in speed). Alternatively, there may be situations where a particular bat species (or other volant animal) is deem to be an SOC, for example, due, due to business interests, regulatory status, conservation organization concern, community interest, and/or other concern, that would warrant targeted mortality reduction efforts for that particular species. a In such a situation, during certain times of the year (e.g., migration season of the SOC), the curtailment plan 68 for the particular wind turbine 55 can be set to an SOC-P curtailment plan 68 (with an increased cut-in speed) independent of the calculated risk level for the particular wind turbine 55.

The mortality data 58 can be frequently updated (e.g., daily). Accordingly, the curtailment plan 68 generated for each wind turbine 55 in a turbine site 57 may also be adjusted on a similarly frequent basis.

A turbine monitor server 72 can communicate with the data server 52 via the network 67. The turbine monitor server 72 can be implemented as a computer. The turbine monitor server 72 can include a database manager 74 that can extract data from the data analyzer 53 of the data server 52 to populate a database 76. The database 76 can be a relational database, such as a Search and Query Language (SQL) database. The database 76 can store, for example, a risk level and a curtailment plan 68 for each wind turbine 55 in the turbine site 57. Additionally, the database 76 can store the mortality data 58 and the environmental data 70. The turbine monitor server 72 can also include a dashboard engine 77 that controls a user-viewable dashboard (e.g., a GUI) that can provide information related to each wind turbine 55 in the turbine site 57. Additionally, the dashboard engine 77 can detect a change in a risk level and/or a curtailment plan 68 and generate a notification (e.g., an email message, a text message, etc.) for a predetermined contact (e.g., a manager) that characterizes the change.

Furthermore, in some examples, the dashboard engine 77 may adjust a risk level of a set of wind turbines 55 at the turbine site 57. For instance, in situations where the first wind turbine 55 (e.g., wind turbine 1) has a risk level of high (corresponding to a high cut-in speed), the dashboard engine 77 may have logic for reducing the risk level (and the corresponding cut-in speed) of the first wind turbine 55 if the overall mortality rate per wind turbine 55 of the turbine site 57 is low enough that thresholds (e.g., a "bat threshold") for mortality of volant animals 59 have not been reached. Similarly, the predetermined contact that receives notifications related to the changes in curtailment plans 68 and/or risk levels 66 may override a curtailment plan 68. As discussed herein, such thresholds can be set to levels to achieve specific goals set forth by policies in businesses, communities and/or government entities. The thresholds can be set to a number of mortalities of a particular species or type of volant animal that is at or below guidelines/regulations set by the businesses, communities and/or government entities to ensure that the specific goals of a particular project are achieved. Accordingly, in situations where the threshold for a particular volant animal has not been reached at a particular turbine site, it may be presumed that curtailment of wind turbines has prevented a significant number of mortalities to that particular volant animal.

Periodically (e.g., about every five minutes) and/or asynchronously, a turbine site control server 78 can query (read) the database 76 via the network 67 for updates to curtailment data 80 (e.g., risk levels and curtailment plans) of the wind turbines 55 at the turbine site 57. The turbine site control server can be implemented as a computer. The turbine site control server 78 can communicate with a turbine programmable logic controller (PLC) 82 to set curtailment parameters (cut-in speed) of the N number of wind turbines 55 of the turbine site 57 based on the curtailment data.

By employing the system 50, daily (or more or less frequent) updates to the mortality data 58 can indirectly control curtailment plans 68 (adaptive curtailment) of the N number of wind turbines 55 at the turbine site 57. In this manner, the curtailment plans can be automatically adjusted based on observed mortalities at the turbine site 57. In contrast to conventional qualitative (and manually intensive) methods of setting curtailment plans of turbine sites, the system 50 provides a more accurate and faster response time for adjusting curtailment plans of the turbine site 57. Accordingly, mortality rates of volant animals 59 (including bats) can be reduced at the turbine site 57 and/or government regulations can be properly followed. Additionally, the system 50 can reduce down time of the wind turbines 55 (e.g., times when one or more of the N number of wind turbines 55 are not generating power).

Figure 2:
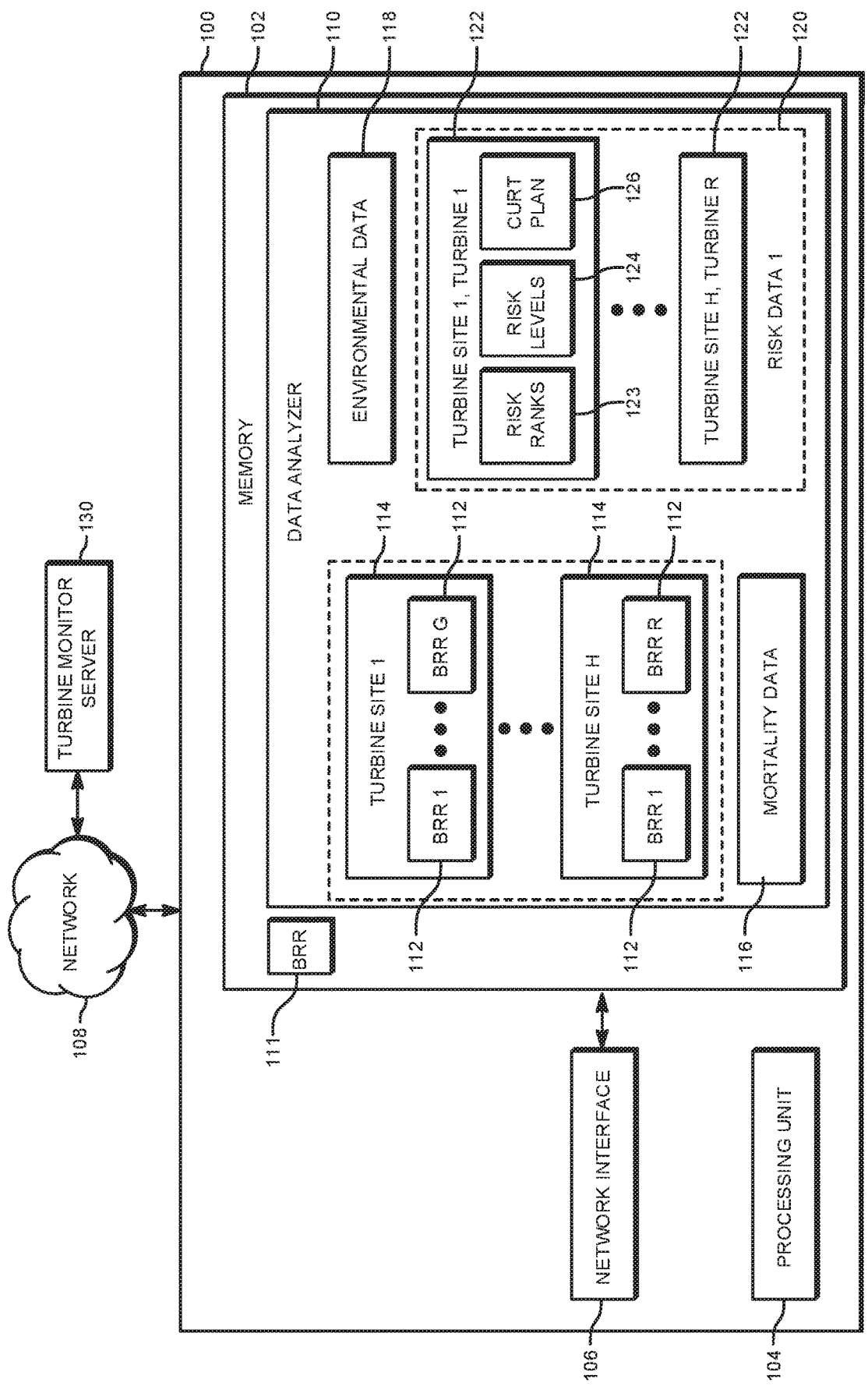
FIG. 2 illustrates an example of a data server to adaptively curtail wind turbines.

FIG. 2 illustrates an example of a data server 100 that could be employed for example, to implement the data server 52 of FIG. 1. The data server 100 can include a memory 102 that can store machine readable instructions. The memory 102 could be implemented, for example, as non-transitory computer readable media, such as volatile memory (e.g., random access memory), nonvolatile memory (e.g., a hard disk drive, a solid state drive, flash memory, etc.) or a combination thereof. The data server 100 can also include a processing unit 104 to access the memory 102 and execute the machine-readable instructions. The processing unit 104 can include, for example, one or more processor cores. The data server 100 can include a network interface 106 configured to communicate with a network 108. The network interface 106 could be implemented, for example, as a network interface card. The network 108 could be implemented for example, as a public network (e.g., the Internet), a private network (e.g., a carrier network) or a combination thereof.

The data server 100 could be implemented, for example in a computing cloud. In such a situation, features of the data server 100, such as the processing unit 104, the network interface 106, and the memory 102 could be representative of a single instance of hardware or multiple instances of hardware with applications executing across the multiple of instances (i.e., distributed) of hardware (e.g., computers, routers, memory, processors, or a combination thereof). Alternatively, the data server 100 could be implemented on a single dedicated server.

The memory 102 can include a data analyzer 110. The data analyzer 110 can be implemented as a document sharing system, such as MICROSOFT SHAREPOINT®, GOOGLE G SUITE®, etc. The data analyzer 110 can receive base risk ranks 111. The base risk ranks 111 can be a data set characterizing a base risk rank 112 assigned to G number of wind turbines in a first turbine site 114 with (labeled in FIG. 2 as "TURBINE SITE 1"), where G is an integer greater than or equal to one. Additionally, the base risk ranks 111 can have H number of turbine sites 114, each with a particular number of wind turbines. In the present example, the Hth turbine site 114 has R number of wind turbines (where R is an integer greater than or equal to 1), such that each turbine site 114 can have a different (or the same) number of wind turbines. Additionally, in some examples, each of the H number of turbine sites 114 may have a unique identifier (e.g., "Site 2") that may characterize a geographic location of the turbine site 114, and each wind turbine in the turbine site 114 may have an identifier (e.g., a numerical value), such that each wind turbine can be indexed by the identifier of the associated turbine site 114 and the identifier of the wind turbine.

In this manner, the base risk rank 112 for each wind turbine in each turbine site 114 can be uniquely assigned. The base risk rank 112 for each wind turbine can be based on a plurality of factors, including geographic location (proximity to woods and/or water), habitat representation, SOCs (if any), etc. The base risk rank 112 for each wind turbines denotes a probability that a given wind turbine, if generating power, will incur a higher mortality rate of volant animals (flying animals) that is acceptable.

Figure 3:
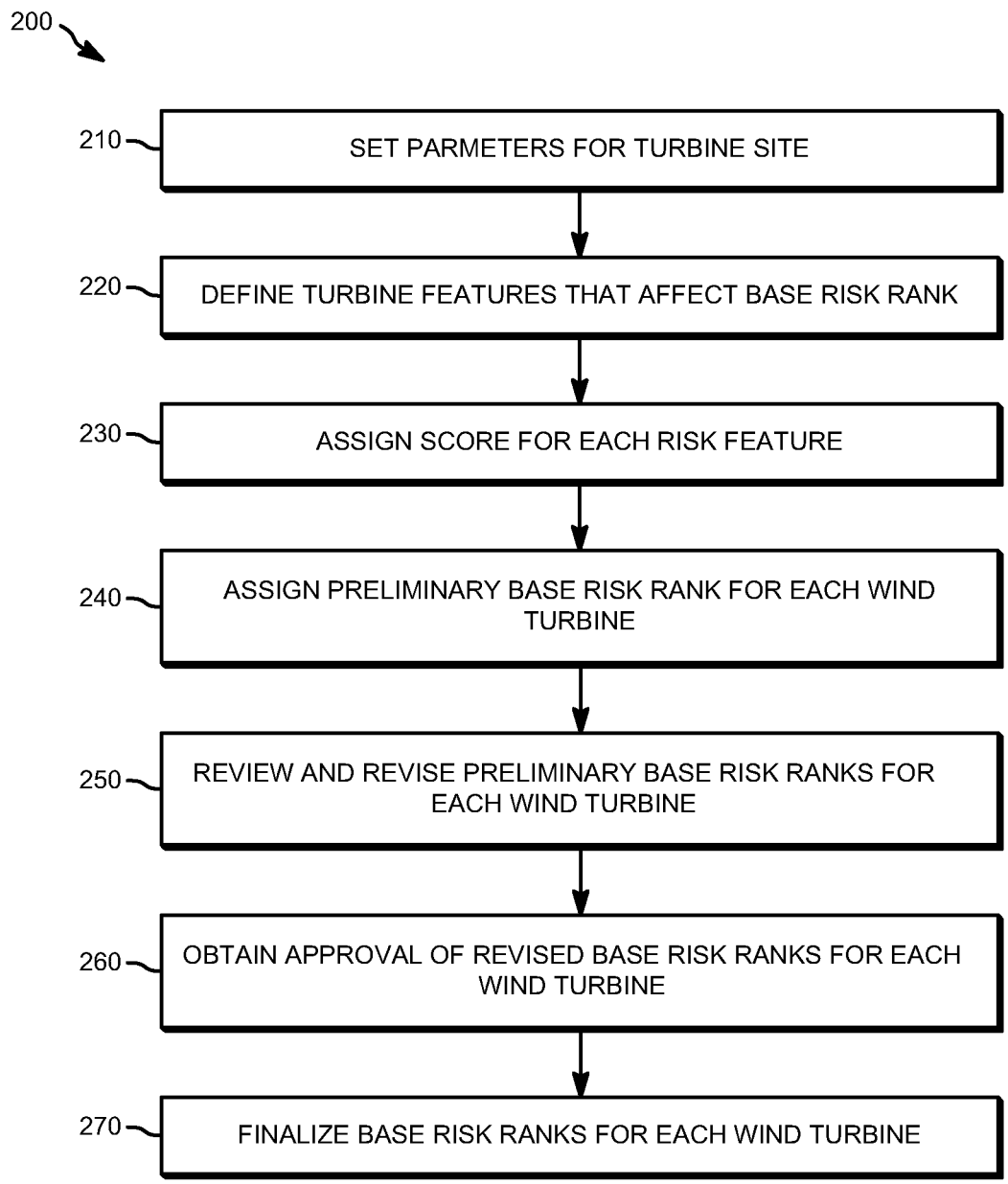
FIG. 3 illustrates a flowchart of an example method for determining a base risk level for a plurality of wind turbines.

FIG. 3 illustrates a flowchart of an example method 200 for determining a base risk rank 112 for each wind turbine in turbine site 114 (e.g., the first turbine site 114). The method 200 can be implemented by a machine learning process and/or multiple individuals that are familiar with the capabilities of the wind turbines as well as the environment of the turbine site. It is noted that the actions described in the method 200 are not meant to be exhaustive. Rather, the method 200 is illustrated and describes as one possible method that a risk rank for each wind turbine in a turbine site may be determined. Moreover, for purposes of simplification of explanation, repeated/similar actions are omitted from the flowchart and the corresponding description. While, for purposes of simplicity of explanation, the example method 200 in FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method 200.

At 210, parameters (e.g., requirements) for the wind turbines (e.g., a subset of the wind turbines, such as 30%) of the turbine site can be defined. Such parameters can include a geographic representation, habitat representation, a list of SOCs, etc. At 220, features that affect a base risk rank of each wind turbine (which can be referred to as "risk features") can be defined. The risk features can include, for example, proximity to woods and/or water, past mortality rates of volant animals, uncertainties, etc. At 230, a score (e.g., a numerical value) can be assigned to each risk feature. At 240, a preliminary base risk rank can be assigned to each wind turbine in the turbine site.

At 250, a committee and/or a machine learning process can review and revise (if needed) the preliminary base ranking for each wind turbine. At 260, approval of the revised base risk ranks can be obtained. In some examples, a subset of the revised risk ranks (e.g., 30%) may be sent to a governmental agency and/or a landowner for approval. At 270, finalized base risk ranks can be determined for each wind turbine in the turbine site.

Referring back to FIG. 2, the base risk ranks 111 can be updated periodically (e.g., annually) and/or on an ad-hoc basis. Additionally, on a frequent basis (e.g., daily or weekly) updated mortality data 116 can be received by the data analyzer 110. The mortality data 116 can be provided to the data server 100 via the network 108.

The mortality data 116 can characterize a list of instances of volant animal mortality and the associated details. The mortality data 116 can be provided by external computing devices (e.g., by end-user devices), such as a client application operating on mobile computing devices and/or web clients via a web page. FIG. 4 illustrates a spreadsheet 300 that is populated with an example of mortality data, which mortality data could be employed as the mortality data 16.

Each row in the spreadsheet 300 characterizes details of a particular instance of a volant animal mortality that occurred within a predetermined distance of a particular wind turbine at a turbine site. Each column of the spreadsheet 300 can characterize a particular detail of the volant animal mortality. For example, a column of the spreadsheet 300 labeled, "Turbine Site" includes an identifier (ID) of a turbine site. Moreover, a column of the spreadsheet 300 labeled, "Date Found" indicates the date that a carcass of the volant animal was discovered. A column of the spreadsheet 300 labeled "Wind Turbine" is an identifier of the wind turbine. As illustrated, it is noted that two wind turbines at different turbine sites may have the same identifier. A column of the spreadsheet 300 labeled "Mortality Type" denotes a general type of volant animal. A column of the spreadsheet 300 labeled "Species" denotes a particular species of the volant animal.

A column of the spreadsheet 300 labeled, "Species of Concern (Y/N)" indicates whether the volant animal is on an SOC list. A column labeled, "M-P" [Monitoring Protocol] indicates a type of monitoring protocol employed to search the associated with turbine for volant animal mortalities. For example, a "Type 1" protocol could be an informal protocol that generally describes guidelines for a search frequency and parameters for each search. Additionally, a "Type 2" protocol could be a formal monitoring protocol set forth, for example, by an internal business unit, a government agency, etc. The formal protocol may have (in some examples) explicit rules/regulations for the search frequency and parameters for each search. A column labeled "Within Threshold Distance" indicates whether the carcass of the volant animal was found within a predetermined distance of the associated wind turbine. The threshold distance could be based on business policies and/or government regulations. In some examples, the threshold distance could be about 20-60 meters.

Referring back to FIG. 2, as noted, the mortality data 116 can be updated daily (and/or continuously). The data analyzer 110 can adjust (e.g., scrub) the mortality data 116 to account for a predetermined uncertainty. For instance, a particular turbine site 114 may have been rated by a business and/or government agency (or other agency) to have a searcher bias indicating that past attempts to search a particular turbine site 114 for volant animal mortalities resulted in discovery of less than an expected number of volant animal mortalities. Additionally or alternatively, the particular turbine site may have been rated by the business and/or government agency to have a scavenger bias indicating that in the past, it has been discovered that scavenger animals (e.g., wolves and/or vultures) remove carcasses of volant animals, which might reduce the number of volant animal mortalities discovered at the particular turbine site 114. Thus, in situations where a particular turbine site 114 has been rated to have a searcher bias and/or a scavenger bias, the mortality data 116 associated with the particular turbine site 114 can be increased (e.g., by a predetermined percentage). Thus, in situations where there is a searcher and/or scavenger uncertainty of 20% for the particular turbine site 114, the data analyzer 110 can be programmed to count each (single) volant animal mortality recorded for the particular turbine site 114 as 1.2 mortalities (or some other number) to account for the predetermined uncertainty.

The mortality data 116 and environmental data 118 (which includes a list of SOCs) can be employed to calculate risk data 120. The risk data 120 can include a curtailment data set 122 for each wind turbine in each turbine site. Thus, the data analyzer 110 can calculate a curtailment data set 122 for the first wind turbine at the first turbine site to the Rth turbine at the Hth turbine site. Each curtailment data set 122 can include a calculated risk rank 123, a risk level 124 and a curtailment plan 126. In other examples, more (or less) data fields can be included in the curtailment data set 122.

FIG. 5 illustrates an example of a spreadsheet 320 that contains an example of the risk data 120 of FIG. 2. Each row in the spreadsheet 320 can correspond to a curtailment data set (e.g., the curtailment data set 122 of FIG. 2) for a particular wind turbine at particular turbine site. The columns in the spreadsheet 320 denote data fields of the curtailment data set. A column of the spreadsheet 320 labeled, "Site Code" can be a shorthand (e.g., 3 letter) identifier for a turbine site. A column of the spreadsheet 320 labeled "Site" can denote a unique ID (e.g., a geographical description) of the turbine site. A column of the spreadsheet 320 labeled "Turbine" can denote an identifier of a particular wind turbine in a turbine site. A column of the spreadsheet 320 labeled "Start Date" can indicate a "turn-on" date for the particular turbine. A column labeled "M-P" can indicate a type of search protocol employed to search for mortality of volant animals with a predetermined frequency (e.g., at least once per week).

A column labeled "Baseline Risk Rank" denotes the predetermined base risk rank for the particular turbine. The predetermined base risk rank can be imported from the base risk ranks 111 of FIG. 2. Moreover, in some examples, as illustrated, the base risk rank may be negative, which can indicate that the base risk rank has been modified manually by an authorized individual (e.g., a manager).

A column of the spreadsheet 320 labeled "All Mortalities" denotes a total number of mortalities of volant animals recorded (from the mortality data 116 of FIG. 2) for the particular turbine for a given year. A column of the spreadsheet 320 labeled "Mortalities as of 7/1" denotes a total number of mortalities of volant animals recorded (from the mortality data 116 of FIG. 2) in a specific timeframe (e.g., July 1-September 30, corresponding to bat migration season) for the particular turbine, which can also be referred to as migration mortalities. A risk rank (e.g., the risk rank 112) for each wind turbine (not illustrated in the spreadsheet 320) can be a sum of the base risk rank and the migration mortalities for the particular wind turbine adjusted for the aforementioned predetermined uncertainty. The risk rank can be mapped to a risk level table to determine the risk level for each wind turbine (e.g., the risk level 124 of FIG. 2).

Figure 6:
FIG. 6 illustrates a spreadsheet that maps a risk rank to a risk level.

FIG. 6 illustrates an example of a risk level map 340. The risk level map 340 maps each risk rank to a particular risk level. Each risk level can correspond to a particular minimum wind cut-in speed. For instance, a risk level of "Low" can correspond to a cut-in speed of about 3.5 meters per second (m/s), a risk level of "Medium" can correspond to a cut-in speed of about 4.5 m/s and a risk level of "High" can correspond to a cut-in speed of about 5.5 m/s. Moreover, a risk level of "Advanced Curtailment" can correspond to a cut-in speed of 6 m/s and a risk level of "$2^{nd}$ Step Advanced Curtailment" can correspond to a cut-in speed of 7 m/s and (in some examples) can only be manually assigned by management or other authoritative entity. Additionally, it is noted that that a risk level of "$2^{nd}$ Step Advanced Curtailment" or higher for a particular turbine may indicate that manual oversight of the particular turbine is needed. Additionally, it is noted that the cut-in speeds for each risk level are examples. In other situations, different cut-in speeds could be employed.

Referring back to FIG. 5, the columns noted by the box 322 denote data fields derived from the environmental data 118 of FIG. 2. In particular, the columns in the box 322 can denote specific curtailment plans for specific SOCs, namely SOC 1 to SOC 4, corresponding to particular wind turbines. In the present example, the curtailment plans can be referred to as species of concern protocols (SOC-Ps). Each SOC-P (e.g., SOC-P1, SOC-P2 and SOC-P3) can be based in part on past performance of each turbine with respect to a particular SOC. For the present example, the plan SOC-P1 indicates a normal curtailment plan (e.g., no particular threat to the SOC). Additionally, as illustrated, the wind turbine "T05" at the site "Site 1" has a curtailment plan of SOC-P3 for bat SOCs. In this situation, the curtailment plan SOC-P3 could correspond, for example, to risk level of "high" (as described in FIG. 6).

A column of the spreadsheet 320 labeled "Site BPT Rate" can indicate an averaged bat mortality per wind turbine ("BPT" rate) at a turbine site associated with each turbine for a given year. Additionally, the column in the spreadsheet 320 labeled "Bat Per Turbine Threshold" can denote a maximum allowable daily BPT rate in order for a turbine site to stay under the threshold for the entirety of the season. Furthermore, a column of the spreadsheet 320 labeled "SOC Count" can indicate a number of SOC mortalities caused by a particular wind turbine in the given year.

A column of the spreadsheet 320 labeled "Curtailment Level (Cut-In Speed)" denotes a particular cut-in speed (in m/s) for each wind turbine. The curtailment level can be based on the risk level and on the data fields in the box 322 for each wind turbine. The data fields (denoting a particular cut-in speed) can be employed to override a curtailment level determined by the risk level of the associated wind turbine. In the present example, the curtailment levels (cut-in speeds) are 0 m/s indicating that a standard cut-in speed can be employed and 5.5 m/s which cut-in speed corresponds to a risk level of "high". A 5.5 m/s cut-in speed could be implemented in situations where business policies, community interests and/or government regulations indicate that volant animal mortalities may be reduced by executing a cautious curtailment plan (corresponding to a risk level of "high") at a particular wind turbine. However, even if the curtailment level (cut-in speed) is 5.5 m/s for a particular wind turbine, if a threshold number of bat mortalities are found within a predetermined amount of time (e.g., 7 during bat migration season) the curtailment level can still change to 6 m/s. Furthermore, the column of the spreadsheet 320 labeled "Curtailment Group" indicates whether each wind turbine is operating in an adaptive management mode (labeled in FIG. 5 as "AM") or if there is a mandate for the curtailment level (labeled in FIG. 5 as "MC" [mandatory control]). The adaptive management mode can also be referred to as automatic curtailment mode.

Referring back to FIG. 2, the data server 100 can communicate with a turbine monitor server 130 via the network 108. The turbine monitor server 130 can extract the risk data 120 from the data analyzer 110 to control a user-viewable dashboard and (indirectly) control a curtailment level of the wind turbines at each of the H number of turbine sites, as explained herein.

Figure 7:
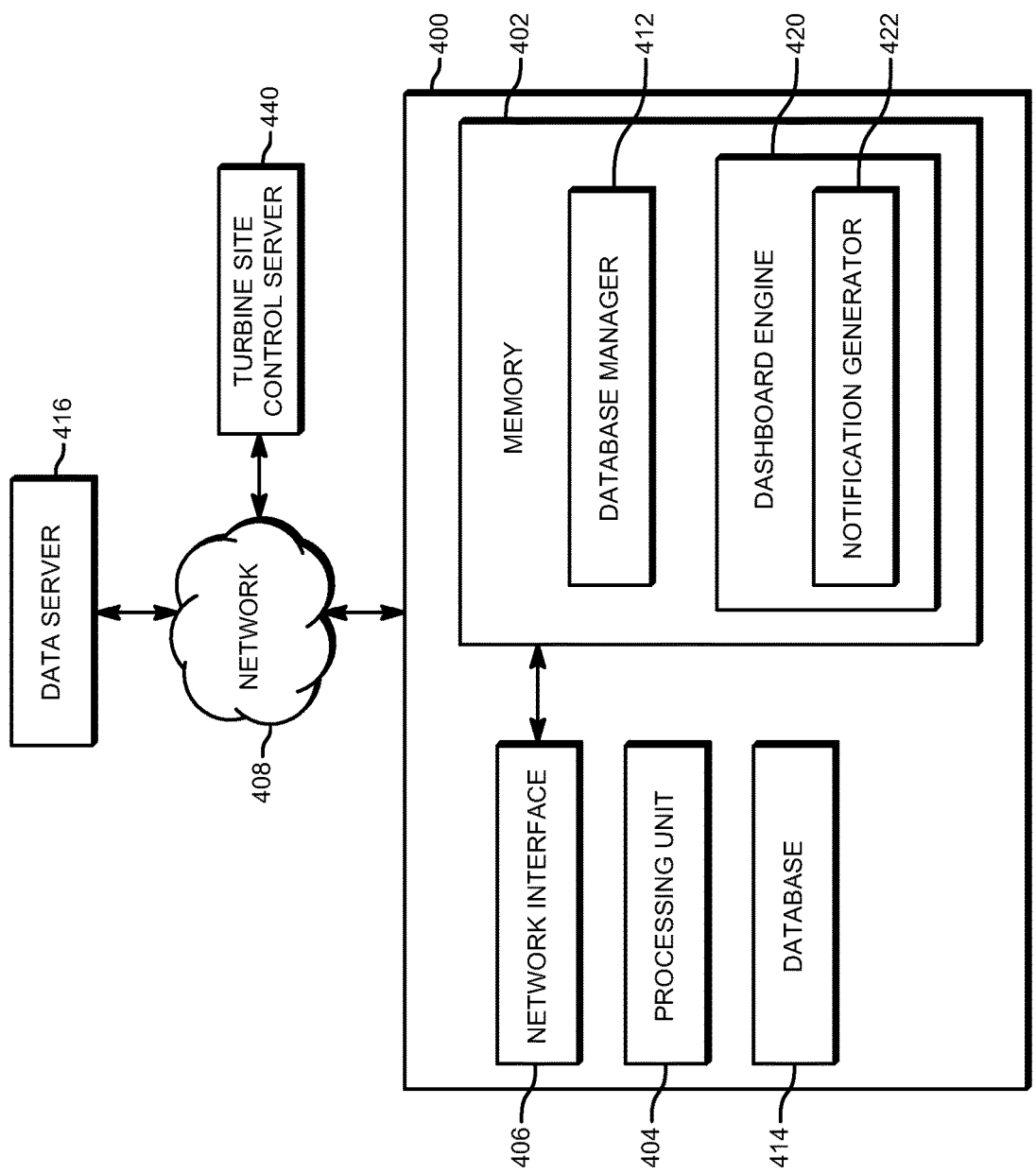
FIG. 7 illustrates an example of a turbine monitor server to adaptively curtail wind turbines.

FIG. 7 illustrates an example of a turbine monitor server 400 that could be employed, for example, to implement the turbine monitor server 72 of FIG. 1 and/or the turbine monitor server 130 of FIG. 2. The turbine monitor server 400 can include a memory 402 that can store machine readable instructions. The memory 402 could be implemented, for example, as non-transitory computer readable media, such as volatile memory, nonvolatile memory or a combination thereof. The turbine monitor server 400 can also include a processing unit 404 to access the memory 402 and execute the machine-readable instructions. The processing unit 404 can include, for example, one or more processor cores. The turbine monitor server 400 can include a network interface 406 configured to communicate with a network 408. The network interface 406 could be implemented, for example, as a network interface card. The network 408 could be implemented for example, as a public network (e.g., the Internet), a private network (e.g., a carrier network) or a combination thereof.

The turbine monitor server 400 could be implemented, for example in a computing cloud. In such a situation, features of the turbine monitor server 400, such as the processing unit 404, the network interface 406, and the memory 402 could be representative of a single instance of hardware or multiple instances of hardware with applications executing across the multiple of instances (i.e., distributed) of hardware (e.g., computers, routers, memory, processors, or a combination thereof). Alternatively, the turbine monitor server 400 could be implemented on a single dedicated server.

The memory 402 can include a database manager 412. The database manager 412 can be, for example, a relational database management system (RDMBS). The database manager 412 can include a front-end for a database 414. The database can be a SQL database, such as a MySQL database or a MICROSOFT® SQL database. The database 414 can be stored in non-transitory memory. In some examples, the database 414 may be external (e.g., in a network-attached storage (NAS) system). In such a situation, the database manager 412 can communicate with the database 414 via the network 408. The database manager 412 can read, write and organize data records in the database.

The database manager 412 can extract risk data from a data server 416 via the network 408. The data server 416 can be implemented as the data server 100 of FIG. 2. As some examples, the risk data can be implemented, as the risk data 120 of FIG. 2 and/or the risk data illustrated in the spreadsheet 320 illustrated in FIG. 5. Similarly, the database manager 412 can extract mortality data from the data server 416. As some examples, the mortality data can be implemented as the mortality data 116 of FIG. 2 and/or the mortality data characterized in the spreadsheet 300 of FIG. 4. The database manager 412 can collate and organize the risk data and the mortality data in the database 414.

The memory 402 can also include a dashboard engine 420. The dashboard engine 420 can communicate with the database manager 412 to retrieve data from the database 414 for maintaining a user-viewable dashboard. The dashboard could be, for example, a web page, or a dashboard that is viewable with a client on an external computing device. As explained herein, FIGS. 8-14 illustrate example views of the dashboard engine 420.

FIG. 8 illustrates an example of a screenshot of a dashboard 450 that can be output by the dashboard engine 420 of FIG. 7. The dashboard 450 can include a first spreadsheet 452. Each column 454 of the first spreadsheet 452 represents an average mortality rate of volant animals per wind turbine at a turbine site. The rows of the first spreadsheet 452 correspond to a specific type of volant animal (bat and bird, but other types could be included in some examples) for a particular year. A second spreadsheet 456 characterizes remaining (allowed) bat mortalities (e.g., "bat threshold") at turbine sites identified in the columns 458. A bat threshold can be based on, for example, business policies/goals, community interests and/or government regulations. The bat threshold can be set to a number of bat mortalities that is at or below guidelines/regulations set by the businesses, communities and/or government entities to ensure that goals of a particular project are achieved. Thus, in a situation where a particular turbine site is operating a level below the bat threshold, bat mortalities are well below mandated maximum allowed bat mortalities. That is, in situations where the bat threshold has not been reached at a particular turbine site, it may be presumed that curtailment of wind turbines has prevented a significant number of bat mortalities.

Figure 9:
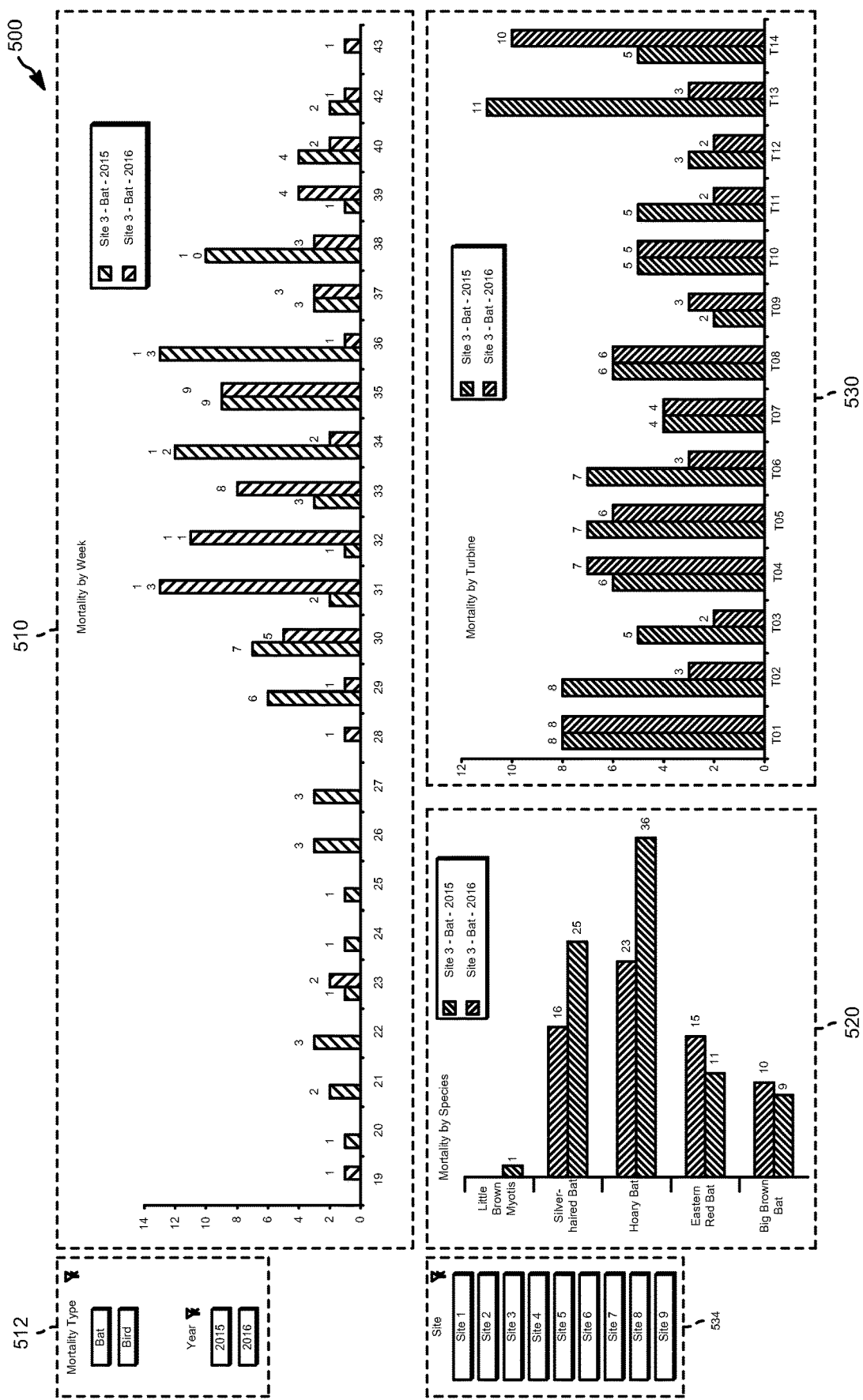
FIG. 9 illustrates another example view of a dashboard.

FIG. 9 illustrates another example of a screenshot of a dashboard 500 that can be output by the dashboard engine 420 of FIG. 7. The dashboard 500 can include a first chart 510 that characterizes a per week mortality average for a particular turbine site in a given time period (e.g., bat migration season) of particular years (or one year). A second chart 520 characterizes mortality by species of bats at a particular turbine site in particular years. A third chart 530 characterizes type of (e.g., bat) mortality by wind turbine for the particular turbine site of the particular years.

A first set of controls (e.g., virtual buttons) 512 included in the dashboard 500 allow selection (e.g., in response to user input) of a type of volant animal displayed in the first second and third charts 510, 520 and 530. Additionally, the first set of controls 512 allows selection of the years (or single year) displayed in the charts 510, 520 and 530.

Additionally, a second set of controls 534 of the dashboard 500 includes user controls (e.g., virtual buttons) that allows selection (e.g., in response to user input) of the particular turbine site displayed in the first, second and third charts 510, 520 and 530.

FIG. 10 illustrates yet another example of a screenshot of a dashboard 550 that can be output by the dashboard engine 420 of FIG. 7. The dashboard 550 includes a first chart 560 that characterizes a bird mortality to exceed threshold and actual bird mortality recorded at each of a plurality of turbine sites. A first set of controls 562 of the dashboard 550 includes controls (e.g., virtual buttons) that allows selection (e.g., in response to user input) of a year displayed in the first chart 560.

A second chart 580 of the dashboard 550 characterizes an historical trend of bat mortalities for a plurality of turbine sites. The second chart 580 plots a total number of volant animal mortalities as of a given week. In one example, the weeks can range over a time period such as the beginning of May to the end of October. In other examples, other longer or shorter time periods can be displayed. A second set of controls 582 of the dashboard 550 includes controls (e.g., virtual buttons) that allows for selection (e.g., in response to user input) of the year(s) displayed in the second chart 580.

Figure 11:
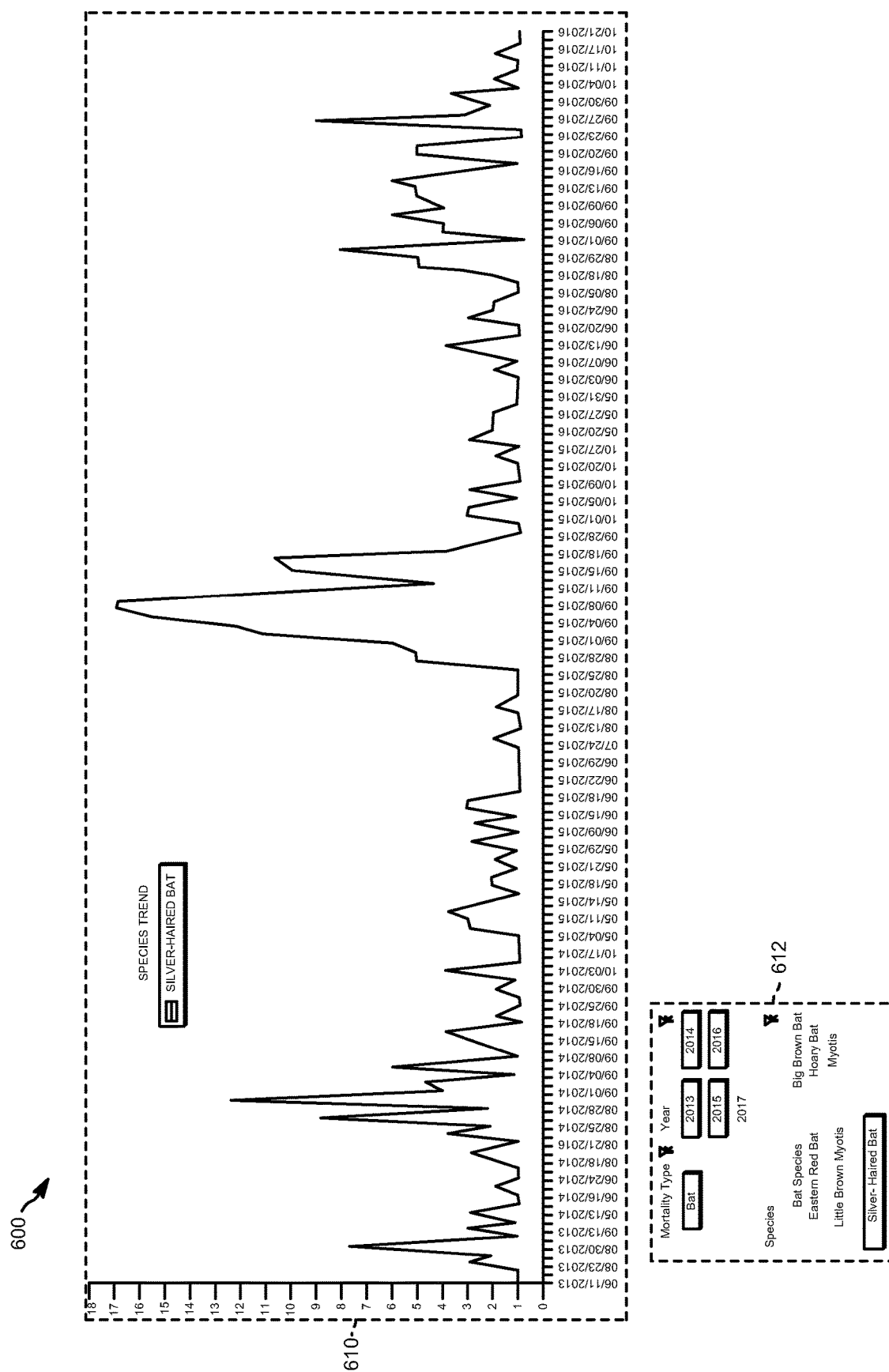
FIG. 11 illustrates still yet another example view of a dashboard.

FIG. 11 illustrates yet another example of a screenshot of a dashboard 600 that could be output by the dashboard engine 420 of FIG. 2. The dashboard 600 can include a chart 610 that characterizes a per day volant animal mortality recorded at a turbine site for a species of volant animal (or a plurality of species of volant animal) for a range of days in a year. The dashboard 600 can also include a set of controls 612 of the dashboard 600 that includes controls (e.g., virtual buttons) for selecting a mortality type of volant animal, a year and a species (or a plurality of species) output at the chart 610.

Figure 12:
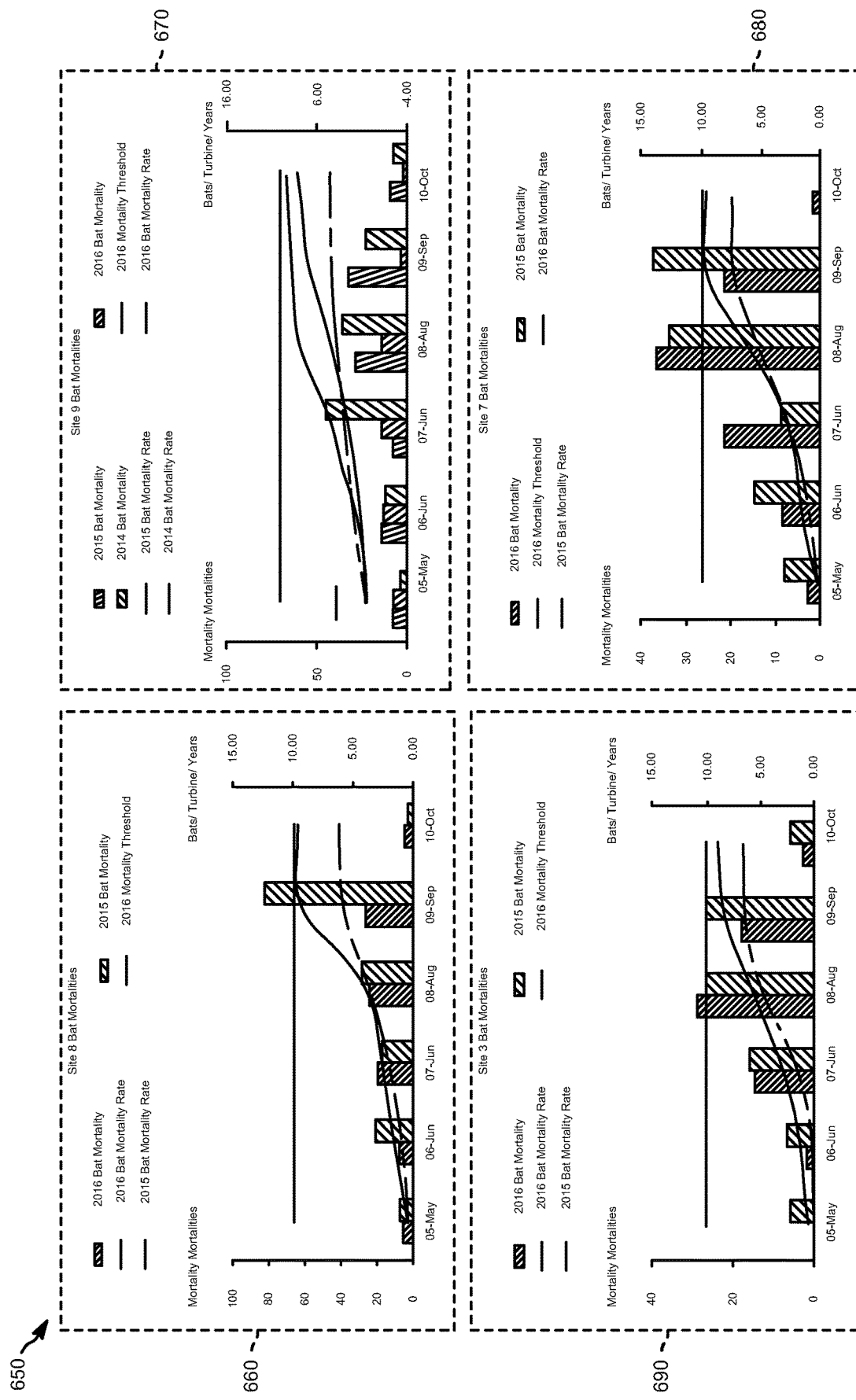
FIG. 12 illustrates yet still another example view of a dashboard.

FIG. 12 illustrates another example of a screenshot of a dashboard 650 that could be output by the dashboard engine 420 of FIG. 7. The dashboard 650 includes a plurality of charts 660, 670, 680 and 690 that each characterize a bat mortality rate for a plurality of years and a bat mortality threshold for a particular year at a respective turbine site (wherein each of the charts 660, 670, 680 and 690 characterizes a different turbine site). Additionally, each of the charts 660, 670, 680 and 690 also plot total bat mortality in specific months (May, June, July, September and October) a respective turbine site. The dashboard 650 can be adjusted such that in the charts 660, 670, 680 and 690, the years (or single year) can be changed. Additionally, more or less charts 660, 670, 680 and 690 can be displayed.

Figure 13:
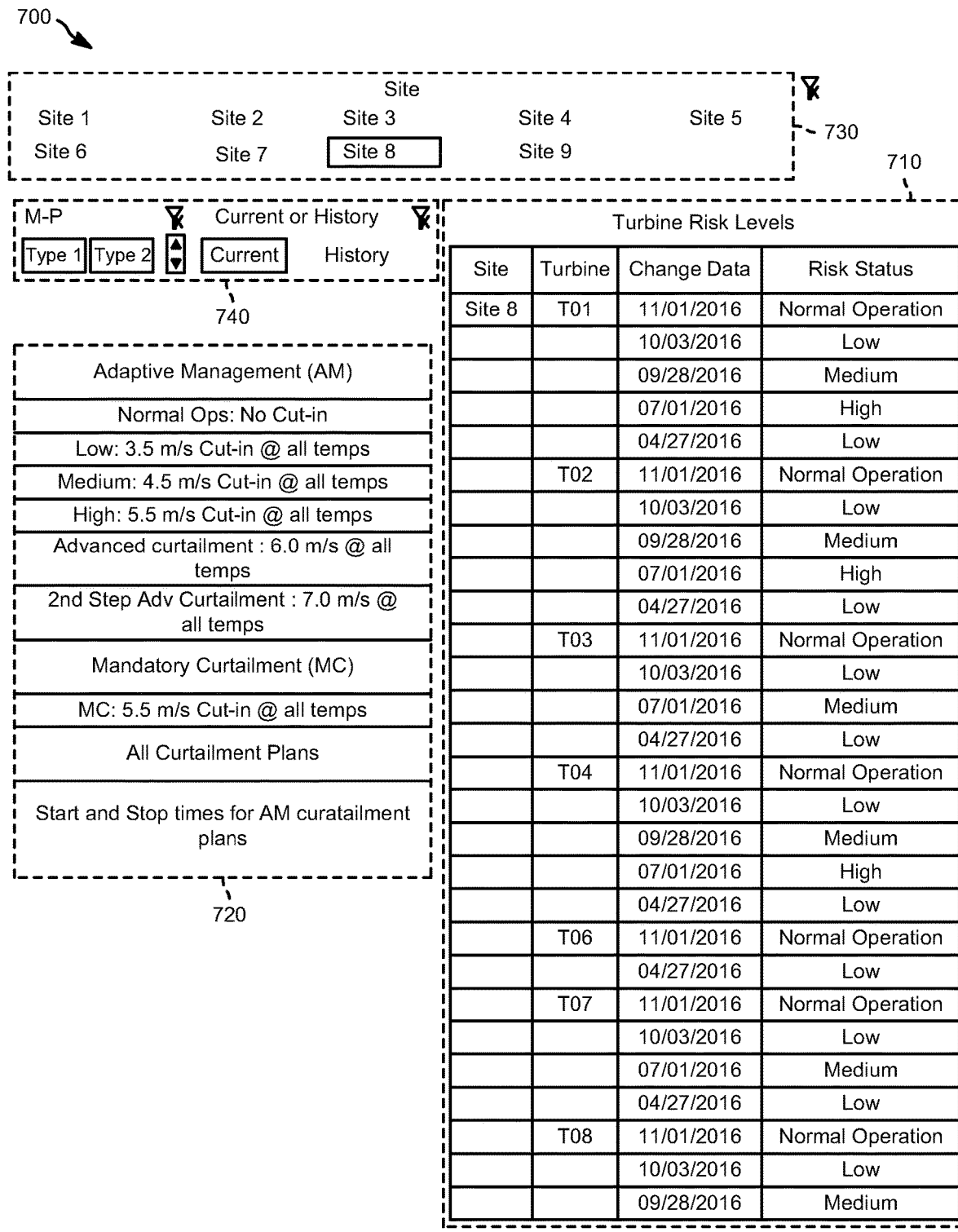
FIG. 13 illustrates further yet another example view of a dashboard.

FIG. 13 illustrates still yet another example of a screenshot of a dashboard 700 that could be output by the dashboard engine 420 of FIG. 7. The dashboard 700 includes a turbine risk level list 710 that lists turbines and a risk level history for each turbine at a particular turbine site. The risk level history can list dates (for a given year) during which a risk level changed for a particular wind turbine at the particular turbine site. Each risk level can have a shading (or color) that characterizes an associated risk level. The dashboard 700 can also include a key 720 that explains the effect (e.g., a cut-in speed) a risk level has on operation of a wind turbine.

The dashboard 700 can include a first set of controls 730. The first set of controls 730 can be implemented as user controls (e.g., virtual buttons) that allow selection of the particular turbine site output in the turbine risk level list 710 in response to user input. Additionally, the dashboard can include a second set of controls 740. The second set of controls 740 can be implemented as user controls (e.g., virtual buttons) that allow for selection of a current status (e.g., a current year) or a prior year(s) output at the turbine risk level list 710.

FIG. 14 illustrates yet still another example of a screenshot of a dashboard 750 that could be output by the dashboard engine 420 of FIG. 7. The dashboard 750 includes a first chart 760 that list bat mortalities by species count for each of a plurality of turbine sites. The dashboard 750 also includes a second chart 770 that characterizes bat mortalities by species (as a portion of 100%) at each of the plurality of turbine sites. The dashboard 750 can also include a set of controls 780. The set of controls 780 can be implemented as user controls (e.g., virtual buttons) that allow for selection of a particular year characterized by the first and second charts 760 and 770.

Referring back to FIG. 7, the dashboard engine 420 can output the examples of the dashboard illustrated in FIGS. 8-14, or a subset thereof. Additionally, the dashboard views illustrated in FIGS. 8-14 are not meant to be exhaustive. Rather, the dashboard views of FIGS. 8-14 are shown as examples that could be employed to allow a user to quickly understand a status of wind turbines at turbine sites in relation to volant animal mortalities.

The dashboard engine 420 can also include a notification generator 422. The notification generator 422 can monitor a risk level status of wind turbines (e.g., as illustrated in FIG. 13). Upon detecting a change in a risk level (by a threshold level) of a given turbine, the notification generator 422 can generate an asynchronous notification (e.g., a substantially real-time notification, such as within about 2 hours) for a predetermined contact (or multiple contacts). For instance, in some examples, upon detecting a change in a risk level from "high" to "advanced curtailment", the notification generator 422 can generate the notification for the predetermined contact (e.g., an asynchronous notification).

Additionally or alternatively, the notification generator 422 can generate a periodic notification for the predetermined contact (or multiple predetermined contacts) with a list of each turbine that has had a risk level change since a prior periodic notification was generated. The periodic notification could be sent hourly, daily, semi-daily, weekly or monthly.

Each (asynchronous and/or periodic) notification can be implemented, for example, as an email and/or a short message (e.g., a text message, such as a short message service (SMS) message). In some examples, each notification can include, for example, information that identifies the particular turbine and the associated turbine site, as well as the change in the risk level. In other examples, each notification can include a link (e.g., web link) to a notification web page maintained by the notification generator 422.

FIG. 15 illustrates an example of a notification 800 that could be provided by the notification generator 422. The notification 800 could be provided as a web page linked to a notification. Alternatively, the notification 800 could be embedded in the notification (e.g., in a body of the notification or as an attachment). The notification 800 can include a list of wind turbines 810 at each of a plurality of turbine sites. Moreover, controls 802 can be included to scroll through multiple pages of the list of wind turbines 810. As one example, a given wind turbine entry 802 can include a currently changed curtailment level for a given wind turbine (e.g., wind turbine "T02" at the "Site 1" turbine site), corresponding to a change of a risk level of "high" to a risk level of "advanced curtailment". Additionally, the given wind turbine entry 802 can include a list of past changes to the risk level of the given wind turbine.

Referring back to FIG. 7, data in the database 414 can be accessed by a turbine site control server 440 via the network 408. In particular, curtailment data characterized by the turbine risk level list 710 of FIG. 13 can be provided to the turbine site control server 440. The turbine site control server 440 can employ the curtailment data to control PLCs at turbine sites to set a curtailment level (e.g., cut-in speed) of wind turbines in a manner described herein.

Figure 16:
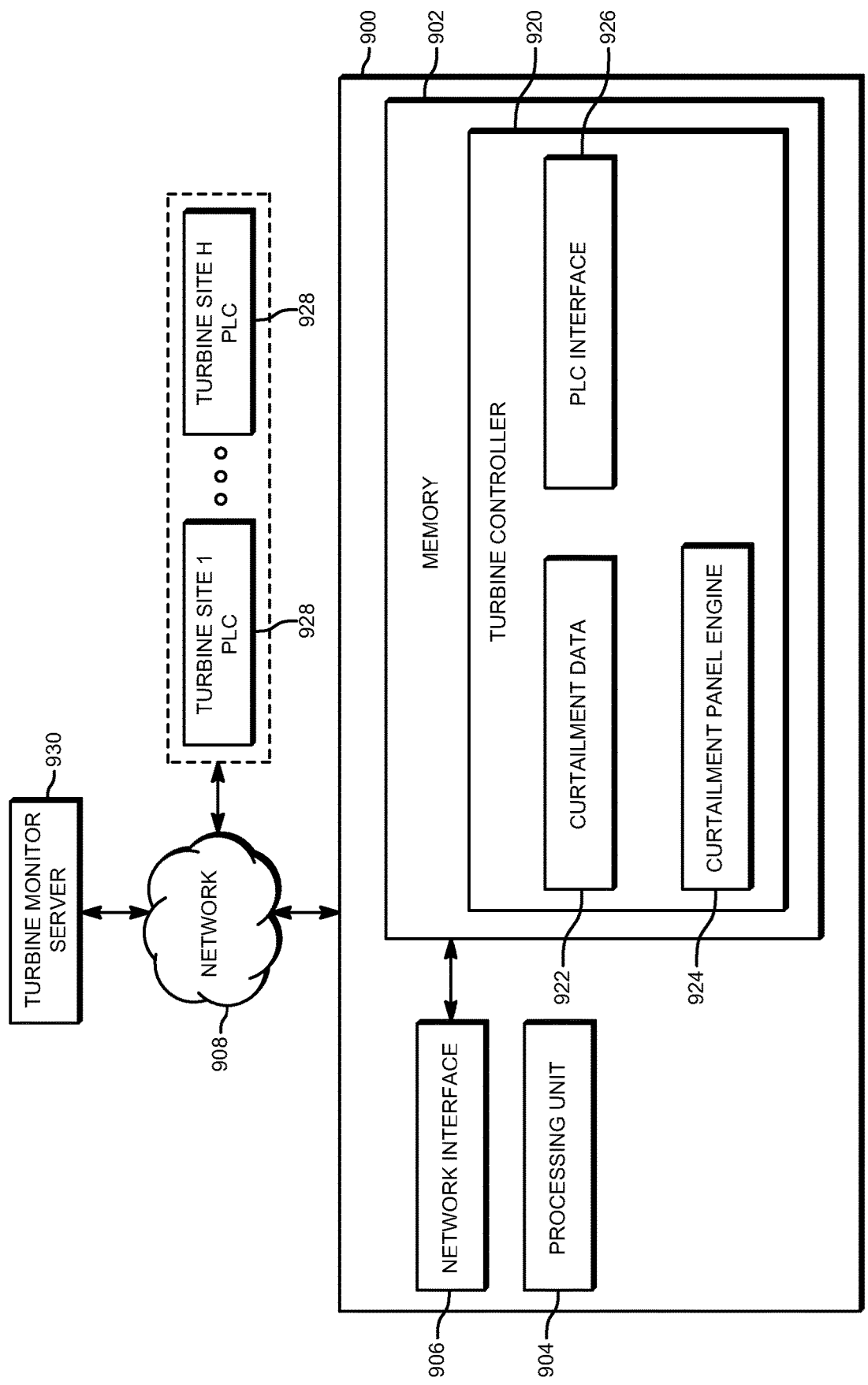
FIG. 16 illustrates an example of a turbine site control server.

FIG. 16 illustrates an example of a turbine site control server 900 that could be employed, for example, to implement the turbine site control server 78 of FIG. 1 and/or the turbine site control server 440 of FIG. 2. The turbine site control server 900 can include a memory 902 that can store machine readable instructions. The memory 902 could be implemented, for example, as non-transitory computer readable media, such as volatile memory, nonvolatile memory or a combination thereof. The turbine site control server 900 can also include a processing unit 904 to access the memory 902 and execute the machine-readable instructions. The processing unit 904 can include, for example, one or more processor cores. The turbine site control server 900 can include a network interface 906 configured to communicate with a network 908. The network interface 906 could be implemented, for example, as a network interface card. The network 908 could be implemented for example, as a public network (e.g., the Internet), a private network (e.g., a LAN) or a combination thereof.

The turbine site control server 900 could be implemented, for example in a computing cloud. In such a situation, features of the turbine site control server 900, such as the processing unit 904, the network interface 906, and the memory 902 could be representative of a single instance of hardware or multiple instances of hardware with applications executing across the multiple of instances (i.e., distributed) of hardware (e.g., computers, routers, memory, processors, or a combination thereof). Alternatively, the turbine site control server 900 could be implemented on a single dedicated server. The turbine site control server 900 can also communicate with a turbine monitor server 930 via the network 908. The turbine monitor server 930 can extract the curtailment data 922 from the turbine controller 920 to control a user-viewable dashboard and (indirectly) control a curtailment level of the wind turbines at each of the H number of turbine sites, as explained herein.

The memory 902 can include a turbine controller 920. The turbine controller 920 can retrieve curtailment data 922 from a database (e.g., the database 414 of FIG. 7) via the network 908. The curtailment data 922 can include a current risk level for each turbine of each of the plurality of turbine sites. Continuing with the example of FIG. 2, there can H turbine sites, each that have one or more wind turbines. For example, the turbine controller 920 can query the database for data characterized in the dashboard 700 of FIG. 13. The turbine controller 920 can query the database periodically (e.g., once per hour) and/or asynchronously.

The turbine controller 920 can also include a curtailment panel engine 924. The curtailment panel engine 924 can generate a curtailment panel based on the curtailment data 922 that can be output on an end-user device (e.g., an end-user computing device) in a web page or a client application.

Figure 17:
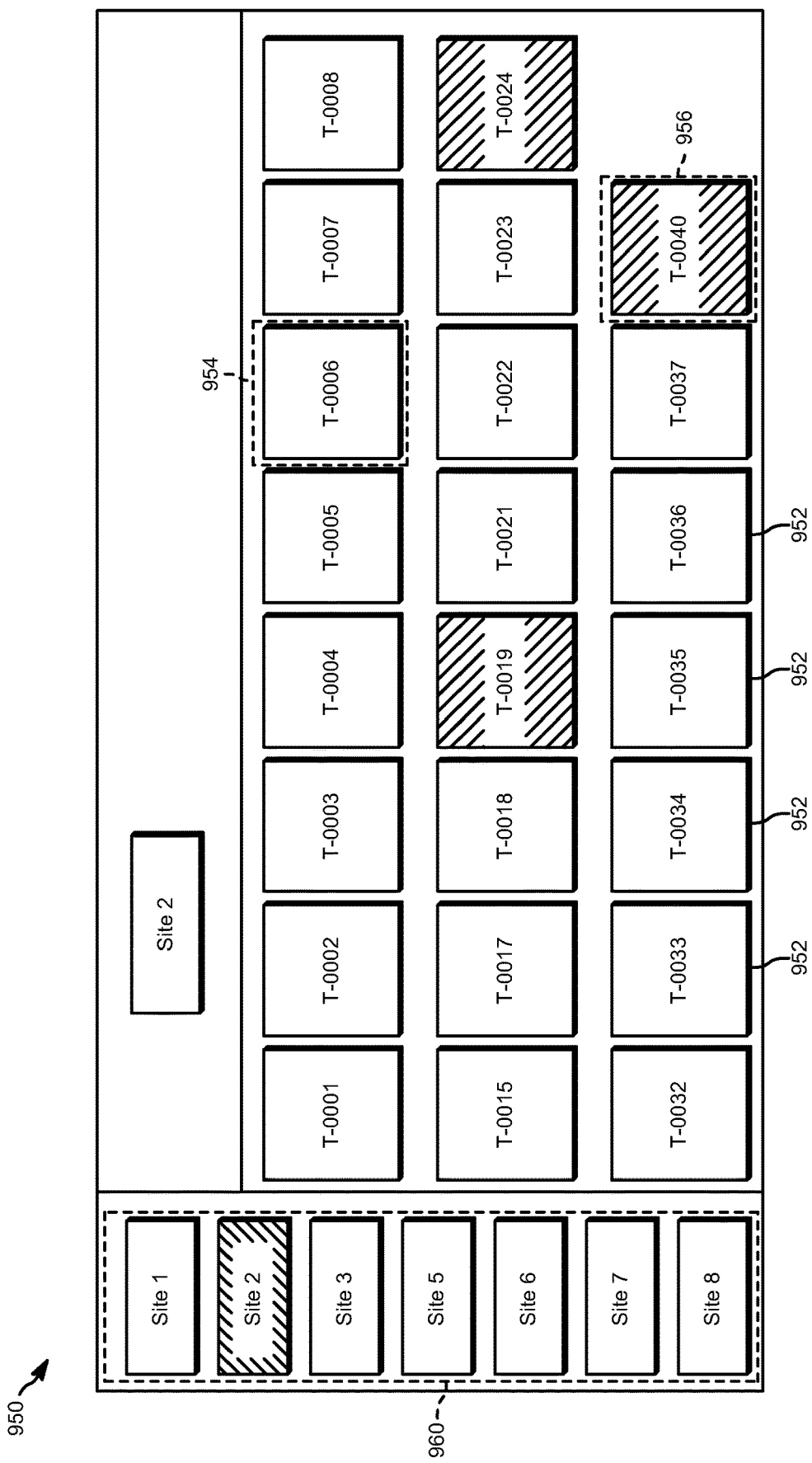
FIG. 17 illustrates an example of a curtailment panel.

FIG. 17 illustrates an example of a curtailment panel 950 that could be output by the curtailment panel engine 924 of FIG. 16. The curtailment panel 950 can include status indicators 952 that each characterizes an operational status of an associated wind turbine at a particular turbine site. For purposes of simplification of explanation, not all of the status indicators 952 are individually labeled. Each status indicator 952 can have an identifier. Thus, an indicator ID of "T-0006" could indicate turbine 06 at the "Site 2" turbine site. Each different shading and/or color can indicate a different curtailment level. For example, a green color (or alternative shading) indicator 954 can denote a curtailment plan of "low" (e.g., cut-in speed of 3.5 m/s). Additionally, a red color (or an alternative shading) identifier 956 can indicate a curtailment level of "high" (e.g., a cut-in speed of 5.5 m/s).

Additionally, the curtailment panel 950 can include an option for manual override. For example, each status indicator 952 can be an actuatable virtual button that, upon actuation can change a curtailment plan of the associated wind turbine. For example, in some situations, actuation of the status indicator 952 can provide a menu to allow selection (e.g., in response to user input) of a particular curtailment plan (e.g., "low"). In this manner, in situations where a particular wind turbine is operating in "advanced curtailment", but an overall bat per turbine mortality rate is low (indicating a "bat threshold" has not been reached), the curtailment speed of the particular wind turbine can be lowered to reduce an amount of non-generating time (idle time) for the particular wind turbine. It is noted that since the bat threshold has not been reached, lowering the curtailment speed of the wind turbine would not affect the goals (of reducing bat mortalities) at the turbine site based on rules/regulations set forth by a business, community and/or government agency. Furthermore, the curtailment panel 950 can include a set of controls 960. The set of controls 960 can be implemented as user controls (e.g., virtual buttons) that allow selection of the particular turbine site output by the curtailment panel 950 (e.g., in response to user input).

Referring back to FIG. 16, the curtailment data 922 (characterized in the curtailment panel 950) can be employed by a PLC interface 926 to communicate with H number of PLC turbine site PLCs 928 via the network 908. Each of the H number of turbine site PLCs 928 can communicate with a set of wind turbines at a particular turbine site. It is also noted that in some examples, more than one PLC may be employed at a turbine site. The PLC interface 926 can provide data to a turbine site PLC 928 that can set a cut-in speed of each wind turbine at a respective turbine site.

Thus, by employing a system illustrated and described with respect to FIGS. 2-15, curtailment plans (e.g., cut-in speeds) of wind turbines at a plurality of turbine sites can be monitored and controlled with relatively little manual supervision. Moreover, the resultant system can reduce a number of volant animal mortalities caused by the wind turbines as well as reduce the chances that a governmental regulation is violated while generating clean renewable electric power.

It is to be understood that although the data server 100 of FIG. 2, the turbine monitor server 400 of FIG. 7 and the turbine site control server 900 of FIG. 16 are illustrated and described as being separate computer systems, in some examples, some or all of the components of the data server 100, the turbine monitor server 400 and/or of the turbine site control server 900 can be integrated on a common server.

Figure 18:
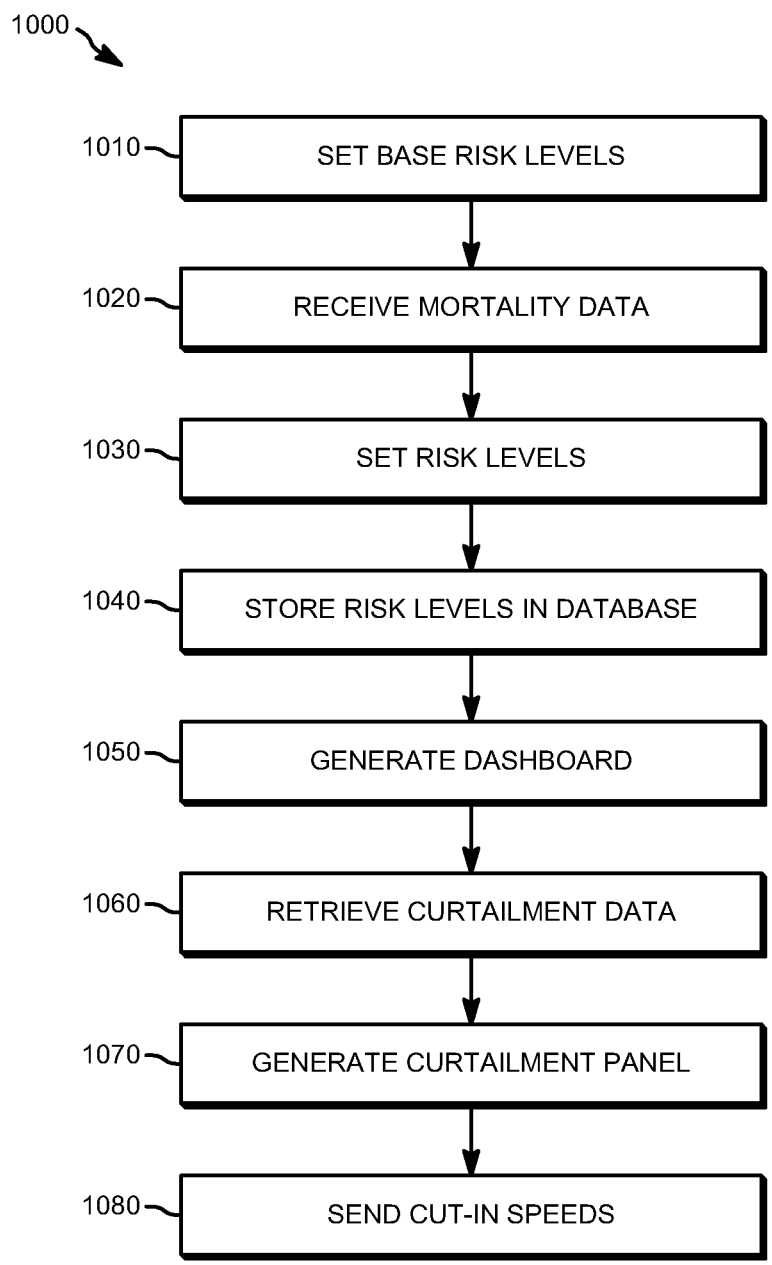
FIG. 18 illustrates a flowchart of an example method for adaptive curtailment of wind turbines.

In view of the foregoing structural and functional features described above, example methods will be better appreciated with reference to FIG. 18. While, for purposes of simplicity of explanation, the example method of FIG. 18 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 18 can be implemented as instructions stored in a non-transitory machine-readable medium. The instructions can be accessed by a processing resource (e.g., one or more processor cores) and executed to perform the methods disclosed herein.

FIG. 18 illustrates a flowchart of an example method 1000 for controlling a curtailment level of each of a plurality of wind turbines a turbine site (or a plurality of turbine sites). The method 1000 can be implemented, for example by the system 50 illustrated in FIG. 1, the data server 100, the turbine monitor server 400 of FIG. 7 and/or the turbine site control server 900 of FIG. 15.

At 1010, base risk levels for the plurality of wind turbines can be received at the data server. The base risk levels can be based on risk factors corresponding to a geographic location of each wind turbine. At 1020, mortality data can be received at the data server. The mortality data can include a list of individual recorded volant animal mortalities and an associated wind turbine.

At 1030, risk levels (corresponding to cut-in speeds) can be set at each of the plurality of wind turbines by the data server. At 1040, the turbine monitor server can retrieve and store the risk levels associated with the plurality of wind turbines from the data server and store the risk levels in a database. At 1050, a (graphical) dashboard can be generated (and/or controlled) by the turbine monitor server 400. The dashboard can characterize, among other things, mortality data trends over time. For instance, the dashboard can provide historical trends (spanning multiple years) of volant animal mortalities for each of the plurality of wind turbines (or some subset thereof).

At 1060, a turbine site control server can retrieve the risk levels associated stored in the database to generate curtailment data. At 1070, the turbine site control server can generate a curtailment panel (e.g., the curtailment panel 950 of FIG. 17). At 1080, cut-in speeds of the plurality of wind turbines can be sent (provided) from the turbine site control server to one or more PLCs at the turbine site.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
    a data server that calculates a risk level of each of a plurality of wind turbines at a turbine site based at least in part on a base risk level and mortality data that characterizes a mortality rate of a volant animal caused by a given wind turbine of the plurality of wind turbines and a mortality rate per wind turbine threshold associated with a site risk level, the site risk level comprising the risk level of each of the plurality of wind turbines at the turbine site;
    a turbine monitor server that stores the risk level of each wind turbine and the site risk level in a database and generates a graphical dashboard based on data in the database;
    and a turbine site control server that retrieves the risk level of each wind turbine and the site risk level from the database, the turbine site control server being configured to set a cut-in speed for each of the plurality of wind turbines based on the risk level of a respective one of the plurality of wind turbines and the site risk level retrieved from the database and to reduce the corresponding cut-in speed of at least one of the plurality of wind turbines before the mortality rate per wind turbine threshold associated with the site risk level has been reached to reduce the idle time of the corresponding wind turbine.

2. The system of claim 1, wherein the data server receives environmental data that identifies a bat species at risk for a given wind turbine of the plurality of wind turbines, and the bat species at risk raises the risk level for the given wind turbine independently from the mortality data.

3. The system of claim 1, wherein the mortality data is updated daily.

4. The system of claim 3, wherein the turbine site comprises a plurality of turbine sites.

5. The system of claim 2, wherein each base risk level is based on a plurality of risk factors corresponding to a geographical location of an associated wind turbine.

6. The system of claim 4, wherein the risk factors include a proximity to woods and/or water.

7. The system of claim 1, wherein the graphical dashboard provided by the turbine monitor server comprises a notification generator that generates a notification for a predetermined contact in response to detecting that a risk level of a given wind turbine of the plurality of wind turbines exceeds the mortality rate per wind turbine threshold associated with the site risk level.

8. The system of claim 1, wherein the graphical dashboard provided by the turbine monitor server comprises a notification generator that generates a periodic notification for a predetermined contact characterizing a change in risk level for one or more wind turbines of the plurality of wind turbines.

9. The system of claim 1, wherein the data server adjusts the mortality data based on a predetermined uncertainty of the turbine site.

10. The system of claim 1, wherein the turbine site control server comprises a programmable logic controller (PLC) interface that communicates with a PLC to set the cut-in speed of each of the plurality of wind turbines based on the risk level of the respective one of the plurality of wind turbines and the site risk level.

11. The system of claim 1, wherein the dashboard outputs data characterizing a mortality rate per wind turbine at the turbine site and an allowable mortality rate per wind turbine for the turbine site.

12. The system of claim 11, wherein the turbine site control server provides a manual override of the cut-in speed.

13. The system of claim 1, wherein the cut-in speed of each wind turbine defines a minimum wind speed for an associated wind turbine to generate electricity.

14. The system of claim 1, wherein the mortality data is provided from a plurality of different end-user devices.

15. The system of claim 1, wherein the turbine site control server provides a curtailment panel that characterizes a risk level associated with each of the plurality of wind turbines at the turbine site.

16. The system of claim 1, wherein the turbine monitor server stores mortality data for each of the plurality of wind turbines in the database for a plurality of years and the dashboard outputs a historical trend chart for each of the plurality of wind turbines characterizing volant animal mortalities recorded at the respective wind turbine for a plurality of years.

17. A server system comprising:
A data server including:
a non-transitory memory that stores machine readable instructions; and
a processing unit that accesses the memory and executes the machine readable instructions, the machine readable instructions comprising:
a data analyzer that:
receives mortality data comprising a list of mortalities of volant animals for each of a plurality of wind turbines at a plurality of turbine sites and a mortality rate per wind turbine threshold associated with a site risk level;
calculates a risk level of each of a plurality of wind turbines at a turbine site based at least in part on a base risk level associated with each of the plurality of wind turbines and the mortality data, wherein the risk level corresponds to a curtailment plan for an associated wind turbine; and
calculates the site risk level of the turbine site comprising the risk level of each of the plurality of wind turbines at the turbine site, wherein the site risk level corresponds to a site curtailment plan for the turbine site to reduce a corresponding cut-in speed of at least one of the plurality of wind turbines before the mortality rate per wind turbine threshold associated with a site risk level has been reached to reduce the idle time of the corresponding wind turbine;
and
a turbine site control server being configured to set a cut-in speed for each of the plurality of wind turbines based on the site risk level that corresponds to the site curtailment plan for the turbine site to reduce a corresponding cut-in speed of at least one of the plurality of wind turbines before the mortality rate per wind turbine threshold associated with a site risk level has been reached to reduce the idle time of the corresponding wind turbine.

18. The server of claim 17, wherein the curtailment plan defines a cut-in speed of the associated wind turbine.

19. A method comprising:
receiving a base risk level for each of a plurality of wind turbines, wherein each base risk level is based on a geographical location of an associated wind turbine;
receiving mortality data characterizing a list of recorded volant animal mortalities, wherein each recorded volant animal mortality is associated with a particular wind turbine and a mortality rate per wind turbine threshold associated with a site risk level, the site risk level comprising the risk level of each of the plurality of wind turbines at the turbine site;
calculating a risk level for each of the plurality of wind turbines based on the mortality data, the base risk level, and the site risk level; and
sending a cut-in speed for each of the plurality of wind turbines to one or more programmable logic controllers based on the calculated risk level of a respective one of the plurality of wind turbines and the site risk level, wherein the site risk level is used to reduce a corresponding cut-in speed of at least one of the plurality of wind turbines before the mortality rate per wind turbine threshold associated with a site risk level has been reached to reduce the idle time of the corresponding wind turbine.

20. The method of claim 19, further comprising outputting a dashboard that characterizes the mortality data collected over a period of time.

* * * * *